(12) United States Patent
Huang et al.

(10) Patent No.: US 11,937,203 B2
(45) Date of Patent: Mar. 19, 2024

(54) SIGNAL TRANSMISSION METHOD AND APPARATUS

(71) Applicant: HUAWEI TECHNOLOGIES CO., LTD., Shenzhen (CN)

(72) Inventors: Su Huang, Shanghai (CN); Lei Chen, Chengdu (CN); Keyvan Zarifi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 200 days.

(21) Appl. No.: 17/401,591

(22) Filed: Aug. 13, 2021

(65) Prior Publication Data

US 2021/0377904 A1 Dec. 2, 2021

Related U.S. Application Data

(63) Continuation of application No. PCT/CN2020/070082, filed on Jan. 2, 2020.

(30) Foreign Application Priority Data

Feb. 15, 2019 (CN) .......................... 201910118143.5

(51) Int. Cl.
*H04W 24/00* (2009.01)
*H04L 5/00* (2006.01)
(Continued)

(52) U.S. Cl.
CPC ......... *H04W 64/003* (2013.01); *H04L 5/0051* (2013.01); *H04W 56/001* (2013.01); *H04W 56/0045* (2013.01); *H04W 56/006* (2013.01)

(58) Field of Classification Search
CPC ............. H04W 64/003; H04W 56/001; H04W 56/0045; H04W 56/006; H04W 72/046;
(Continued)

(56) References Cited

U.S. PATENT DOCUMENTS 10,797,837 B2 * 10/2020 Takeda ................. H04B 7/0634
11,323,157 B2 * 5/2022 Zhang .................. H04B 7/0452
(Continued)

FOREIGN PATENT DOCUMENTS

CN 103797871 A 5/2014
CN 105589506 A 5/2016
(Continued)

OTHER PUBLICATIONS

Huawei et al., "Correction on aperiodic SRS trigger time offset in38.214", 3GPP TSG-RAN WG1 Ad Hoc Meeting, Vancouver, Canada Jan. 22-26, 2018; R1-1800935, Jan. 12, 2018, XP051384512, total 2 pages.
(Continued)

*Primary Examiner* — Stephen M D Agosta
(74) *Attorney, Agent, or Firm* — Maier & Maier, PLLC

(57) ABSTRACT

A signal transmission method and an apparatus. The method includes: a location management device receives first SRS resource configuration information from a serving cell and/or a neighboring cell. The location management device sends second SRS resource configuration information to a terminal device, where the second SRS resource configuration information includes third SRS resource configuration information and a downlink reference signal associated with an SRS resource indicated by the third SRS resource configuration information, and the third SRS resource configuration information is a part or all of the first SRS resource configuration information. The location management device configures the SRS resource for the terminal device, so that the SRS resource can be associated with the downlink reference signal. This helps the terminal device obtain information about a transmission beam for sending an SRS, and therefore SRS receiving efficiency of the cell can be improved to some extent.

13 Claims, 6 Drawing Sheets

(51) Int. Cl.
*H04W 56/00* (2009.01)
*H04W 64/00* (2009.01)

(58) Field of Classification Search
CPC .... H04W 72/23; H04L 5/0051; H04L 5/0094; H04L 5/005; H04L 5/0073; H04L 5/0048; G01S 5/04; G01S 5/06; G01S 5/0205
See application file for complete search history.

(56) References Cited

U.S. PATENT DOCUMENTS

| | | | |
|---|---|---|---|
| 2011/0098054 A1* | 4/2011 | Gorokhov | H04B 7/024 455/422.1 |
| 2011/0312355 A1* | 12/2011 | Cheng | H04J 11/0036 455/501 |
| 2012/0252474 A1* | 10/2012 | Tiirola | H04L 5/0053 455/450 |
| 2013/0039296 A1* | 2/2013 | Damnjanovic | H04W 72/23 370/329 |
| 2013/0039319 A1* | 2/2013 | Shi | H04L 5/0023 370/328 |
| 2013/0242895 A1* | 9/2013 | Chen | H04W 72/04 370/329 |
| 2014/0269451 A1* | 9/2014 | Papasakellariou | H04L 5/0053 370/280 |
| 2015/0003391 A1* | 1/2015 | Chen | H04L 5/0044 370/329 |
| 2015/0023191 A1* | 1/2015 | Kim | H04W 56/0045 370/336 |
| 2015/0110037 A1* | 4/2015 | Wu | H04L 5/0048 370/329 |
| 2015/0124743 A1* | 5/2015 | Damnjanovic | H04W 76/15 370/329 |
| 2015/0223231 A1* | 8/2015 | Noh | H04L 1/00 370/329 |
| 2016/0330707 A1* | 11/2016 | Das | H04L 67/02 |
| 2017/0048717 A1* | 2/2017 | Yoo | H04L 5/1469 |
| 2017/0202007 A1* | 7/2017 | Miao | H04L 5/0055 |
| 2017/0208568 A1* | 7/2017 | Nam | H04W 72/23 |
| 2017/0264409 A1* | 9/2017 | Guo | H04B 7/0413 |
| 2017/0302419 A1* | 10/2017 | Liu | H04L 5/0091 |
| 2017/0374637 A1* | 12/2017 | Akkarakaran | H04W 64/006 |
| 2018/0234959 A1 | 8/2018 | Ahn et al. | |
| 2018/0248616 A1* | 8/2018 | Tiirola | H04W 72/12 |
| 2019/0037529 A1* | 1/2019 | Edge | H04L 1/04 |
| 2019/0149365 A1* | 5/2019 | Chatterjee | H04L 25/0226 370/329 |
| 2019/0173534 A1* | 6/2019 | Kakishima | H04L 5/0048 |
| 2019/0223190 A1* | 7/2019 | Hwang | H04L 1/08 |
| 2019/0230580 A1* | 7/2019 | Kim | H04W 48/16 |
| 2019/0379501 A1* | 12/2019 | Park | H04W 16/28 |
| 2020/0154421 A1* | 5/2020 | Niu | H04W 74/0833 |
| 2020/0162289 A1* | 5/2020 | Ahn | H04L 5/0053 |
| 2020/0213979 A1* | 7/2020 | Chen | H04W 72/046 |
| 2020/0389805 A1* | 12/2020 | Kim | H04W 72/23 |
| 2020/0389885 A1* | 12/2020 | Tomeba | H04W 72/21 |
| 2021/0036825 A1* | 2/2021 | Choi | H04L 5/0048 |
| 2021/0336745 A1* | 10/2021 | Takano | H04L 5/0051 |
| 2022/0110160 A1* | 4/2022 | Takeda | H04L 5/0053 |
| 2022/0159736 A1* | 5/2022 | Chen | H04L 5/0048 |
| 2022/0407639 A1* | 12/2022 | Ren | G01S 5/0244 |

FOREIGN PATENT DOCUMENTS

| | | |
|---|---|---|
| CN | 106572478 A | 4/2017 |
| CN | 106793069 A | 5/2017 |
| CN | 108092697 A | 5/2018 |
| CN | 108111272 A | 6/2018 |
| CN | 108282285 A | 7/2018 |
| CN | 108882327 A | 11/2018 |
| CN | 109151885 A | 1/2019 |
| WO | 2017223301 A1 | 12/2017 |
| WO | 2018028540 A1 | 2/2018 |
| WO | 2018056789 A1 | 3/2018 |
| WO | 2018127066 A1 | 7/2018 |
| WO | 2018127181 A1 | 7/2018 |
| WO | 2018128504 A1 | 7/2018 |
| WO | 2018201958 A1 | 11/2018 |
| WO | 2018203728 A1 | 11/2018 |
| WO | 2018206017 A1 | 11/2018 |

OTHER PUBLICATIONS

Qualcomm Incorporated. "Summary of 7.2.10.4: PHY procedures for positioning measurements." 3GPP TSG-RAN WG1 Meeting #97. Reno, Nevada, USA. May 13-17, 2019. Draft R1-1907675. 17 pages.

Fraunhofer IIS et al. "NR beam management supporting multi-gNB measurements for positioning." 3GPP TSG RAN WG1 Meeting #95, Spokane, US. Nov. 12-16, 2018. R1-1813583. 8 pages.

3GPP TS 38.211 V15.4.0 (Dec. 2018). "3rd Generation Partnership Project; Technical Specification Group Radio Access Network; NR; Physical channels and modulation (Release 15)." 96 pages.

LG Electronics. "Discussions on Possible Techniques for NR Positioning." 3GPP TSG RAN WG1 Meeting #95. Spokane, USA. Nov. 12-16, 2018. R1-1812595. 8 pages.

3GPP TS 38.331 V15.4.0 (Dec. 2018). "3rd Generation Partnership Project; Technical Specification Group Radio Access Network; NR; Radio Resource Control (RRC) protocol specification (Release 15)." 474 pages.

Qualcomm Incorporated. "NG-RAN Positioning Architecture and Procedures." 3GPP TSG-RAN WG2 Meeting #104. Spokane, USA. Nov. 12-16, 2018. R2-1817898. 17 pages.

Huawei, et al., "UL reference signal design for measurement", 3GPP TSG RAN WG1 Meeting #87, Reno, USA, Nov. 14-18, 2016, R1-1611686, 3 pages.

Huawei et al., "UL SRS design for CSI acquisition and beam management", 3GPP TSG RAN WG1 NR Ad Hoc Meeting, Spokane, USA, Jan. 16-20, 2017, R1-1700074, 8 pages.

Huawei et al., "Ul Srs design for beam management and CSI acquisition", 3GPP Tsg Ran WG1 Nr Ad Hoc Meeting, Qingdao, China, Jun. 27-30, 2017, R1-1709936, 8 pages.

* cited by examiner

SIGNAL TRANSMISSION METHOD AND APPARATUS

CROSS-REFERENCE TO RELATED APPLICATIONS

This application is a continuation of International Application No. PCT/CN2020/070082, filed on Jan. 2, 2020, which claims priority to Chinese Patent Application No. 201910118143.5, filed on Feb. 15, 2019. The disclosures of the aforementioned applications are hereby incorporated by reference in their entireties.

TECHNICAL FIELD

The embodiments relate to the communications field, and more specifically, to a signal transmission method and an apparatus.

BACKGROUND

In a fifth generation (5G) system or a new radio (NR) system, a sounding reference signal (SRS) is an uplink reference signal sent by a terminal device. The SRS may be used for positioning, for example, may be used in an uplink time difference of arrival (UTDOA) positioning method, an uplink angle of arrival (UAOA) positioning method, or an enhanced cell identity (ECID) positioning method, a multi-cell round trip time (Multi-RTT) positioning method, and the like. For example, in the UTDOA positioning method, a terminal device sends an SRS, a serving cell and a neighboring cell of the terminal device receive the SRS sent by the terminal device, and measure reception time information of the SRS. A location management device calculates an uplink time difference of arrival based on the reception time information of the SRS received by each cell, and positions the terminal device.

In the conventional technology, the serving cell of the terminal device configures an SRS resource for the terminal device, and there is the following problem: when sending an SRS, the terminal device cannot learn of information related to a beam of a cell that receives the SRS. This may affect SRS transmission efficiency.

SUMMARY

The embodiments provide a signal transmission method and an apparatus. When a sounding reference signal (SRS) resource is configured for a terminal device, the SRS resource can be associated with a downlink reference signal of a cell. This helps the terminal device obtain beam information for sending an SRS, and therefore efficiency of SRS transmission between the terminal device and the cell can be improved to some extent.

According to a first aspect, a signal transmission method is provided. The method includes: a location management device receives first sounding reference signal resource configuration information from a cell. The location management device sends second SRS resource configuration information to a terminal device, where the second SRS resource configuration information includes third SRS resource configuration information and a downlink reference signal that is of the cell and that is associated with an SRS resource indicated by the third SRS resource configuration information, and the third SRS resource configuration information is a part or all of the first SRS resource configuration information.

Optionally, the cell includes a serving cell and/or a neighboring cell of the terminal device.

The terminal device may learn of, based on the second SRS resource configuration information, the SRS resource indicated by the third SRS resource configuration information, that is, a time-frequency resource for sending an SRS. The terminal device may further learn of, based on the second SRS resource configuration information, the downlink reference signal associated with the SRS resource. The terminal device may determine, based on beam training information or beam information of the downlink reference signal, beam information for receiving the downlink reference signal that is of the cell and that is associated with the SRS resource, and then may learn of, by using a beam correspondence, beam information for sending the SRS, that is, a transmission beam for sending the SRS. The terminal device sends the SRS based on the determined time-frequency resource for sending the SRS and the beam information for sending the SRS.

The terminal device can send the SRS based on the beam information determined based on the downlink reference signal that is of the cell and that is associated with the SRS resource, so that the cell can effectively receive the SRS to some extent. Compared with the conventional technology, this solution can improve SRS transmission efficiency.

Therefore, in the embodiments, the location management device configures the SRS resource for the terminal device, so that the SRS resource can be associated with the downlink reference signal of the cell. This helps the terminal device obtain the beam information for sending the SRS, and therefore the SRS transmission efficiency can be improved to some extent.

The first SRS resource configuration information may include resource configuration information of one or more groups of SRS resources.

For example, the first SRS resource configuration information may include resource configuration information of a plurality of SRSs, and the plurality of SRSs may be sent to a plurality of cells. For example, the first SRS resource configuration information includes resource configuration information of five SRSs, and the five SRSs are separately sent by the terminal device to five different cells.

Resource configuration information of each SRS includes at least information for indicating a time-frequency resource of an SRS resource.

For example, the resource configuration information of each SRS may include the following information: a starting resource block (RB) of the SRS resource; frequency hopping configuration of the SRS resource, including an SRS bandwidth; periodic configuration of the SRS resource, and optionally, for a periodic SRS and a semi-persistent SRS, a periodicity and an offset within the periodicity; and a sequence ID of the SRS resource.

The third SRS resource configuration information is a part or all of the first SRS resource configuration information. In other words, the SRS resource indicated by the third SRS resource configuration information is a part or all of SRS resources indicated by the first SRS resource configuration information. For example, the first SRS resource configuration information includes resource configuration information of five SRS resources, and the third SRS resource configuration information includes resource configuration information of three of the five SRS resources. For another example, alternatively, some resource configuration information, for example, an SRS bandwidth, in the third SRS resource configuration information may be modified on the basis of the first SRS resource configuration information.

With reference to the first aspect, in a possible implementation of the first aspect, the downlink reference signal associated with the SRS resource indicated by the third SRS resource configuration information is a downlink positioning reference signal of the cell or a synchronization signal/physical broadcast channel block (SS/PBCH block) of the cell. The SS/PBCH block may be referred to as an SSB for short.

Optionally, in some implementations, the downlink reference signal associated with the SRS resource indicated by the third SRS resource configuration information may include a downlink reference signal associated with each of a plurality of SRS resources of the cell.

Optionally, in some implementations, the downlink reference signal associated with the SRS resource indicated by the third SRS resource configuration information may be a common downlink reference signal associated with an SRS resource set including a plurality of SRS resources of the cell.

Optionally, in some implementations, the downlink reference signal associated with the SRS resource indicated by the third SRS resource configuration information may be used by the terminal device to determine beam information of the cell, and may be further used by the terminal device to determine a downlink timing of the cell.

For differentiation, the second SRS resource configuration information may carry two types of downlink reference signals. One type is used to determine the beam information of the cell, and the other type is used to determine the downlink timing of the cell.

With reference to the first aspect, in a possible implementation of the first aspect, the second SRS resource configuration information further includes spatial relationship information of the SRS resource indicated by the third SRS resource configuration information.

The spatial relationship information of the SRS resource may be a downlink positioning reference signal of the cell or another cell-specific reference signal of the cell. The downlink positioning reference signal of the cell includes a CSI-RS, and the another cell-specific reference signal of the cell includes an SS/PBCH block.

The downlink reference signal associated with the SRS resource may be a downlink reference signal in the spatial relationship information of the SRS resource, and is not independently configured any more. Alternatively, a downlink reference signal in the spatial relationship information of the SRS resource may be the downlink reference signal associated with the SRS resource, and is not independently configured any more.

The spatial relationship information of the SRS resource may correspond to an uplink reference signal, or may correspond to a downlink reference signal.

When the spatial relationship information of the SRS resource corresponds to an uplink reference signal, the terminal device may use a transmission beam of the reference signal corresponding to the spatial relationship information of the SRS resource as the transmission beam for sending the SRS. The cell may use a reception beam of the reference signal corresponding to the spatial relationship information of the SRS resource as a reception beam for receiving the SRS. When the spatial relationship information of the SRS resource corresponds to a downlink reference signal, the terminal device may use a reception beam of the reference signal corresponding to the spatial relationship information of the SRS resource as the transmission beam for sending the SRS. The cell may use a transmission beam of the reference signal corresponding to the spatial relationship information of the SRS resource as a reception beam for receiving the SRS. The cell herein represents a network device in a cell, for example, a base station.

In the embodiments, the location management device configures the spatial relationship information of the SRS resource for the terminal device. This helps the terminal device obtain the transmission beam for sending the SRS, and therefore improves SRS transmission efficiency.

With reference to the first aspect, in a possible implementation of the first aspect, the downlink reference signal associated with the SRS resource indicated by the third SRS resource configuration information is used by the terminal device to determine the downlink timing of the cell, and the second SRS resource configuration information further includes: an uplink timing advance (TA) of the cell.

Optionally, the uplink TA of the cell is obtained by the location management device based on an estimated location of the terminal device and a location of the cell.

The terminal device may determine, based on the downlink timing of the cell and the uplink TA of the cell, an SRS uplink timing corresponding to the cell.

In the embodiments, after receiving the second SRS resource configuration information, the terminal device may obtain the downlink timing of the cell based on the downlink reference signal that is of the cell and that is associated with the SRS resource, and may further learn of the uplink TA of the cell. Then, the terminal device obtains the SRS uplink timing of the cell based on the downlink timing of the cell and the uplink TA of the cell, so that the SRS may be sent based on the SRS uplink timing. It should be understood that the terminal device sends the SRS at the SRS uplink timing, so that the sending of the SRS can be synchronized to an uplink carrier of the cell, to avoid interference to an original uplink of the cell.

With reference to the first aspect, in a possible implementation of the first aspect, the method further includes: the location management device sends an SRS resource request message to the cell, to request the first SRS resource configuration information. The cell sends the first SRS resource configuration information to the location management device based on the SRS resource request message.

With reference to the first aspect, in a possible implementation of the first aspect, the method further includes: the location management device sends an SRS measurement request message to the cell.

The SRS measurement request message may include a measurement type, where the measurement type includes any one or more of the following: SRS reception time information, SRS reception angle information, or an SRS-based Rx-Tx time difference.

Optionally, the SRS measurement request message includes the third SRS resource configuration information.

Alternatively, the SRS measurement request message includes the third SRS resource configuration information and the spatial relationship information of the SRS resource indicated by the third SRS resource configuration information.

The third SRS resource configuration information is sent to the cell, so that the cell can receive the SRS based on the third SRS resource configuration information. The spatial relationship information of the SRS resource indicated by the third SRS resource configuration information is sent to the cell, so that the cell can determine, based on the downlink reference signal, the reception beam for receiving the SRS. In this way, SRS receiving efficiency of the cell can be effectively improved. That is, the SRS transmission efficiency is improved.

With reference to the first aspect, in a possible implementation of the first aspect, the method further includes: the location management device receives an SRS measurement result from the cell, where the SRS measurement result includes any one or more of the following: SRS reception time information, SRS reception angle information, or an SRS-based Rx-Tx time difference.

According to the embodiments, the SRS transmission efficiency can be improved. That is, the SRS receiving efficiency of the cell can be improved, so that efficiency of sending the SRS measurement result by the cell to the location management device can be improved. Therefore, efficiency of positioning the terminal device by the location management device can be improved.

With reference to the first aspect, in a possible implementation of the first aspect, the method further includes: the location management device requests the terminal device to report a difference between a reception time point and a transmission time point for the cell, where the reception time point is a downlink frame timing of the downlink reference signal associated with the SRS resource indicated by the third SRS resource configuration information, and the transmission time point is an uplink frame timing at which the terminal device sends the SRS.

Optionally, the terminal device may alternatively actively report the foregoing information to the location management device.

The difference that is between the reception time point and the transmission time point for the cell and that is reported by the terminal device is received. This helps the location management device improve accuracy of positioning the terminal device.

A second aspect provides a signal transmission method, where the method includes: a terminal device determines first SRS resource configuration information sent by a location management device, where the first SRS resource configuration information includes second SRS resource configuration information and a downlink reference signal that is of a cell and that is associated with an SRS resource indicated by the second SRS resource configuration information, and the cell includes a serving cell and/or a neighboring cell; and the terminal device sends an SRS based on the first SRS resource configuration information.

Optionally, the cell includes a serving cell and/or a neighboring cell of the terminal device.

For explanations of the first SRS resource configuration information and second SRS resource configuration information, refer to the explanations in the first aspect. Details are not described herein again.

Based on the explanations in the first aspect, in the solutions of the embodiments, the location management device configures the SRS resource for the terminal device, so that the SRS resource can be associated with the downlink reference signal of the cell. This helps the terminal device obtain the beam information for sending the SRS, and therefore SRS transmission efficiency can be improved to some extent.

With reference to the second aspect, in a possible implementation of the second aspect, the downlink reference signal associated with the SRS resource indicated by the second SRS resource configuration information is a downlink positioning reference signal of the cell or a synchronization signal/physical broadcast channel (SS/PBCH) block of the cell.

With reference to the second aspect, in a possible implementation of the second aspect, the first SRS resource configuration information further includes an uplink TA of the cell; and that the terminal device sends an SRS based on the first SRS resource configuration information includes: sending the SRS based on the uplink TA of the cell.

Optionally, the uplink TA of the cell is obtained by the location management device based on an estimated location of the terminal device and a location of the cell.

The terminal device may determine, based on the downlink timing of the cell and the uplink TA of the cell, an SRS uplink timing corresponding to the cell.

After receiving the second SRS resource configuration information, the terminal device may obtain the downlink timing of the cell based on the downlink reference signal that is of the cell and that is associated with the SRS resource, and may further learn of the uplink TA of the cell. Then, the terminal device obtains the SRS uplink timing of the cell based on the downlink timing of the cell and the uplink TA of the cell, so that the SRS may be sent based on the SRS uplink timing. It should be understood that the terminal device sends the SRS at the SRS uplink timing, so that the sending of the SRS can be synchronized to an uplink carrier of the cell, to avoid interference to an original uplink of the cell.

With reference to the second aspect, in a possible implementation of the second aspect, the first SRS resource configuration information further includes spatial relationship information of the SRS resource indicated by the second SRS resource configuration information; and that the terminal device sends an SRS based on the first SRS resource configuration information includes: sending the SRS by using a beam indicated by the spatial relationship information.

For explanations of the spatial relationship information of the SRS resource, refer to the explanations in the first aspect. Details are not described herein again.

In the embodiments, the location management device configures the spatial relationship information of the SRS resource for the terminal device. This helps the terminal device obtain the transmission beam for sending the SRS, and therefore improves SRS transmission efficiency.

With reference to the second aspect, in a possible implementation of the second aspect, the method further includes: the terminal device reports, to the location management device, a difference between a reception time point and a transmission time point for the cell, where the reception time point is a downlink frame timing of the downlink reference signal associated with the SRS resource indicated by the second SRS resource configuration information, and the transmission time point is an uplink frame timing at which the terminal device sends the SRS.

Optionally, the terminal device may report the foregoing information based on a request from the location management device.

The difference between the reception time point and the transmission time point for the cell reported by the terminal device is received. This helps the location management device improve accuracy of positioning the terminal device.

A third aspect provides a signal transmission method. The method includes: a cell sends SRS resource configuration information to a location management device. The cell receives an SRS from a terminal device, to obtain an SRS measurement result, where the SRS is a part or all of SRSs indicated by the SRS resource configuration information. The cell sends the SRS measurement result to the location management device, where the measurement result includes any one or more of the following: SRS reception time information, SRS reception angle information, or an SRS-based Rx-Tx time difference.

Optionally, the cell includes a serving cell and/or a neighboring cell of the terminal device.

For explanations of SRS resource configuration information, refer to the explanations in the first aspect. Details are not described herein again.

Base on the explanations in the first aspect, in the solutions of the embodiments n, the location management device configures the SRS resource for the terminal device, so that the SRS resource can be associated with the downlink reference signal of the cell. This helps the terminal device obtain beam information for sending the SRS, and therefore SRS transmission efficiency can be improved to some extent.

With reference to the third aspect, in a possible implementation of the third aspect, the method further includes: the cell receives an SRS measurement request message from the location management device.

The SRS measurement request message may include a measurement type, where the measurement type includes any one or more of the following: SRS reception time information, SRS reception angle information, or an SRS-based Rx-Tx time difference.

Optionally, in some implementations, the SRS measurement request message includes the third SRS resource configuration information.

The third SRS resource configuration information is sent to the cell, so that the cell can receive the SRS based on the third SRS resource configuration information.

Because the terminal device sends the SRS based on the third SRS resource configuration information, when the cell receives the SRS based on the third SRS resource configuration information, SRS transmission efficiency can be improved.

Alternatively, in some implementations, the SRS measurement request message includes the third SRS resource configuration information and spatial relationship information of the SRS resource indicated by the third SRS resource configuration information.

For explanations of the spatial relationship information of the SRS resource, refer to the explanations in the first aspect. Details are not described herein again.

The cell may determine, based on beam training information or beam information of the downlink reference signal, beam information for receiving the downlink reference signal that is of the cell and that is associated with the SRS resource, and further obtain SRS reception beam information, that is, information about a reception beam for receiving the SRS.

Therefore, the spatial relationship information of the SRS resource indicated by the third SRS resource configuration information is sent to the cell, so that the cell can determine, based on the downlink reference signal, the reception beam for receiving the SRS. In this way, SRS receiving efficiency of the cell can be effectively improved. That is, the SRS transmission efficiency is improved.

In addition, the SRS measurement request message carries the third SRS resource configuration information and the spatial relationship information of the SRS resource, so that signaling overheads can be reduced to some extent.

Optionally, in some of the foregoing implementations, a state in which the terminal device sends the SRS may be a connected state (RRC_CONNECTED state), an idle state (RRC_IDLE state), or an inactive state (RRC_INACTIVE state).

In the embodiments, the location management device is used to configure the SRS resource for the terminal device. For example, the location management device may configure the SRS resource for the terminal device by using the LTE Positioning Protocol/NR Positioning Protocol (LPP/NPP). Therefore, provided that the location management device configures the SRS resource for the terminal device, even if the terminal device enters the RRC_IDLE state or the RRC_INACTIVE state, the SRS resource configured for the terminal device is not released. Therefore, this embodiment can overcome a problem in the conventional technology that a configured SRS resource no longer exists when a terminal device enters the RRC_IDLE state or the RRC_INACTIVE state.

According to a fourth aspect, a communication apparatus is provided. The communication apparatus is configured to perform the method provided in the first aspect, the second aspect, or the third aspect. Optionally, the communication apparatus may include a module configured to perform the method provided in the first aspect, the second aspect, or the third aspect.

According to a fifth aspect, a communication apparatus is provided. The communication apparatus includes a memory and a processor, the memory is configured to store instructions, the processor is configured to execute the instructions stored in the memory, and the execution of the instructions stored in the memory enables the processor to perform the method provided in the first aspect, the second, or the third aspect.

According to a sixth aspect, a chip is provided. The chip includes a processing module and a communication interface, the processing module is configured to control the communication interface to communicate with the external, and the processing module is further configured to implement the method provided in the first aspect, the second, or the third aspect.

According to a seventh aspect, a computer-readable storage medium is provided, where the computer-readable storage medium stores a computer program. When the computer program is executed by a computer, the computer is enabled to implement the method provided in the first aspect, the second aspect, or the third aspect.

According to an eighth aspect, a computer program product including instructions is provided. When the instructions are executed by a computer, the computer is enabled to implement the method provided in the first aspect, the second aspect, or the third aspect.

According to a ninth aspect, a communication system is provided, including the communication apparatus provided in the fourth aspect and configured to perform the method provided in the first aspect, the communication apparatus provided in the fourth aspect and configured to perform the method provided in the second aspect, and the communication apparatus provided in the fourth aspect and configured to perform the method provided in the third aspect.

The communication apparatus provided in the fourth aspect and configured to perform the method provided in the first aspect may be referred to as a location management device, the communication apparatus provided in the fourth aspect and configured to perform the method provided in the second aspect may be referred to as a terminal device, and the communication apparatus provided in the fourth aspect and configured to perform the method provided in the third aspect may be referred to as a network device in a cell, such as a base station in a cell.

Thus, in the embodiments, the location management device configures the SRS resource for the terminal device, so that the SRS resource can be associated with the downlink reference signal of the cell. This helps the terminal device obtain the beam information for sending the SRS, and therefore the SRS transmission efficiency can be improved to some extent.

DETAILED DESCRIPTION OF THE EMBODIMENTS

Figure 1:
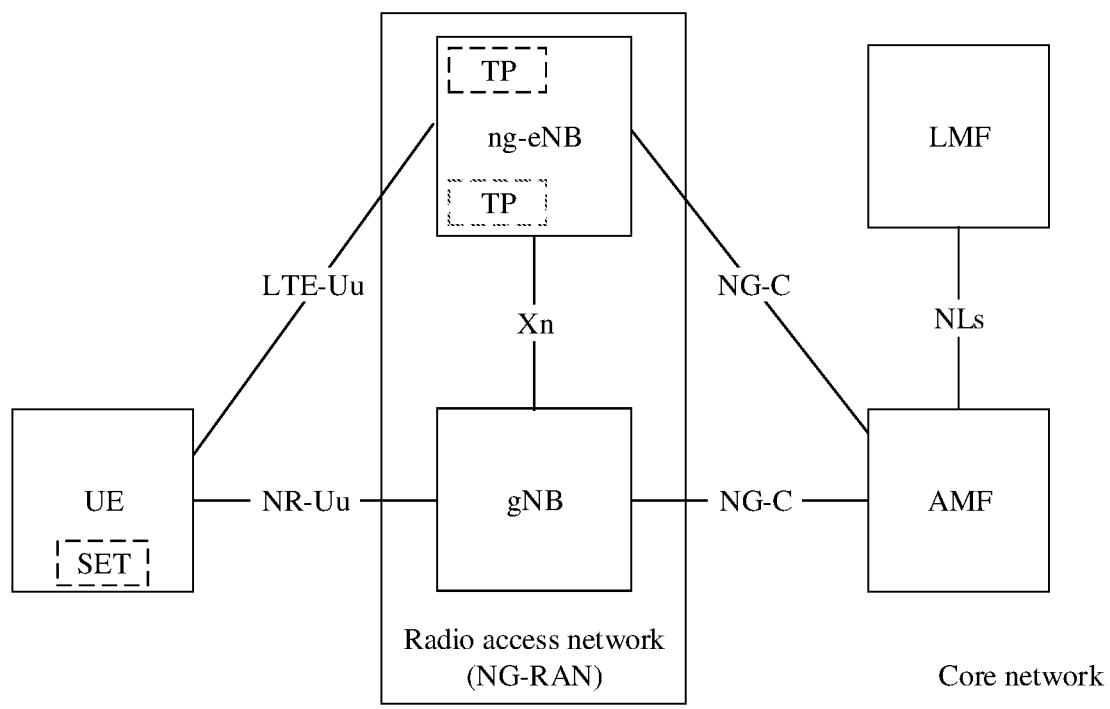
FIG. 1 is a schematic diagram of a communication architecture to which an embodiment is applied.

The following describes solutions of the embodiments with reference to accompanying drawings.

Unless otherwise defined, all technical and scientific terms used herein have the same meaning as commonly understood by a person of ordinary skill in the art to which the embodiments pertain. Terms used i are merely for the purpose of describing embodiments, and are non-limiting.

Embodiments may be applied to a beam-based communication architecture, for example, a 5G system or a new radio (NR) system.

For ease of understanding of the embodiments, the following first describes some terms used in the embodiments.

1. Beam

In the 5G system or the NR system, high-frequency communication is adopted. In other words, data is transmitted by using a signal of a high-frequency band (for example, a frequency band higher than 6 GHz). A main problem of high-frequency communication is that energy of a signal sharply decreases as a transmission distance increases, resulting in a relatively short transmission distance of the signal. To overcome this problem, an analog beam technology is proposed for high-frequency communication. In the analog beam technology, a large-scale antenna array concentrates signal energy in a small range to form a beam-like signal, to increase a transmission distance. This beam-like signal may be referred to as an analog beam, or a beam for short. In other words, in the 5G system or the NR system, a network device may generate different beams, where different beams point to different transmission directions. The network device may send or receive a signal by using different beams. A terminal device may also generate different beams, where different beams point to different transmission directions. The terminal device may send or receive a signal by using different beams. For example, in uplink signal transmission, when a reception beam of the network device matches a transmission beam of the terminal device, the network device may effectively receive a signal sent by the terminal device.

The beam in an NR protocol may be embodied as a spatial domain filter that is also referred to as a spatial filter or a spatial parameter. A beam for sending a signal may be referred to as a transmission beam (Tx beam), which may be referred to as a spatial domain transmission filter or a spatial transmission parameter. A beam for receiving a signal may be referred to as a reception beam (Rx beam), which may be referred to as a spatial domain reception filter or a spatial reception parameter (spatial RX parameter).

The transmission beam may refer to distribution of signal strength formed in different directions in space after a signal is transmitted by using an antenna, and the reception beam may refer to distribution of signal strength that is of a radio signal received from an antenna and that is in different directions in space.

In addition, the beam may be a wide beam, a narrow beam, or a beam of another type.

A technology of forming the beam may be a beamforming technology or another technology. The beamforming technology may be a digital beamforming technology, an analog beamforming technology, a hybrid digital/analog beamforming technology, or the like A beam generally corresponds to a resource. For example, when beam measurement is performed, the network device measures different beams by using different resources, and the terminal device feeds back resource quality obtained through measurement, so that the network device knows quality of a corresponding beam. During data transmission, beam information is also indicated by using a resource corresponding to the beam information. For example, the network device indicates information about a physical downlink shared channel (PDSCH) beam of the terminal device by using a transmission configuration index (TCI) resource in downlink control information (DCI).

Optionally, a plurality of beams with same or similar communication features may be considered as one beam.

One beam may include one or more antenna ports, configured to transmit a data channel, a control channel, a sounding signal, and the like. The one or more antenna ports forming the beam may also be considered as one antenna port set.

In the embodiments, unless otherwise specified, the beam is a transmission beam of the network device.

During beam measurement, each beam of the network device corresponds one resource. Therefore, a beam corresponding to a resource may be uniquely identified by an index of the resource.

2. Beam Pairing Relationship

The beam pairing relationship represents a pairing relationship between a transmission beam and a reception beam, that is, a pairing relationship between a spatial transmit filter and a spatial receive filter. A relatively large beamforming gain may be obtained by transmitting a signal between the transmission beam and the reception beam that have the beam pairing relationship.

In an implementation, a transmit end and a receive end may obtain the beam pairing relationship through beam training. For example, the transmit end may send a reference signal through beam sweeping, and the receive end may also receive a reference signal through beam sweeping. For example, the transmit end may form different directional beams in space through beamforming, and may perform polling on a plurality of different directional beams, to transmit a reference signal through the different directional beams, so that a power for transmitting the reference signal can reach a maximum value in a direction directed by a transmission beam. The receive end may also form different directional beams in space through beamforming, and may perform polling on a plurality of different directional beams, to receive the reference signal by using the different directional beams, so that a power for receiving the reference signal by the receive end can reach a maximum value in a direction directed by the reception beam.

By traversing each transmission beam and each reception beam, the receive end may perform channel measurement based on the received reference signal, and report a measurement result to the transmit end. For example, the receive end may report, to the transmit end, some reference signal resources with relatively high reference signal received powers (RSRP), for example, report an identifier of the reference signal resource, so that the transmit end receives and sends a signal by using a beam pairing relationship with relatively good channel quality during data or signaling transmission.

FIG. 1 is a schematic diagram of a communication architecture to which an embodiment is applied. The communication architecture includes a terminal device (shown as UE in FIG. 1), a radio access network (NG-RAN), and a core network.

The core network includes an access and mobility management function (AMF), a location management function (LMF), and the like. The AMF functions as a gateway and the like, and the LMF functions as a positioning center and the like. The AMF and the LMF are connected through an NLs interface.

The radio access network (NG-RAN) includes one or more ng-eNBs and gNBs. The ng-eNB represents an LTE base station that accesses a 5G core network, and the gNB represents a 5G base station that accesses a 5G core network.

Communication between an ng-eNB and a gNB, communication between two ng-eNBs, or communication between two gNBs is performed through an Xn interface. The Xn interface may also be referred to as an XnAP interface.

The radio access network is connected to the core network via the AMF through an NG-C interface.

The terminal device is connected to the radio access network via the ng-eNB through an LTE-Uu interface. The terminal device may alternatively be connected to the radio access network via the gNB through an NR-Uu interface.

The core network may directly communicate with the terminal device by using the LPP/NPP protocol.

It should be understood that the communication architecture may include one or more base stations (including the ng-eNB and the gNB).

It should be further understood that the communication architecture may include one or more terminal devices, for example, one or more terminal device sets (the UE set shown in FIG. 1).

One gNB may send data or control signaling to one or more terminal devices. Alternatively, a plurality of gNBs may send data or control signaling to one terminal device.

The ng-eNB in FIG. 1 may alternatively be replaced with a transmission point (TP) (the TP shown in FIG. 1).

Figure 2:
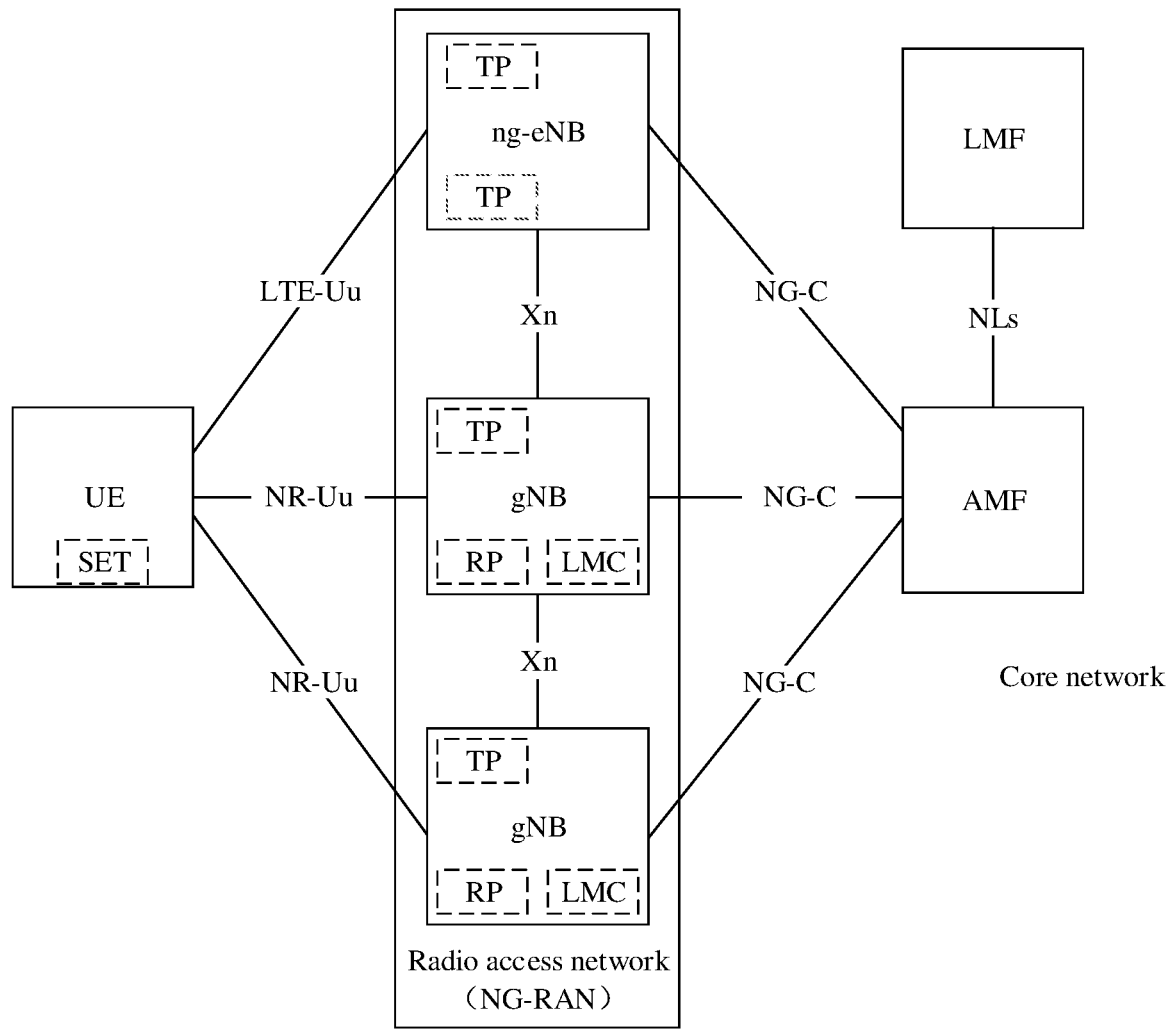
FIG. 2 is a schematic diagram of a communication architecture to which an embodiment is applied.

FIG. 2 is a schematic diagram of another communication architecture to which an embodiment is applied. The communication architecture includes a terminal device (shown as UE in FIG. 2), a radio access network (NG-RAN), and a core network.

The core network includes an AMF, an LMF, and the like. The AMF functions as a gateway and the like, and the LMF functions as a positioning center and the like. The AMF and LMF are connected through an NLs interface.

The radio access network (NG-RAN) includes one or more ng-eNBs and gNBs. The ng-eNB represents an LTE base station that accesses a 5G core network, and the gNB is a 5G base station that accesses a 5G core network.

The gNB includes a location management component (LMC), and the LMC may undertake some functions of the LMF. In this way, if the LMF functions that the LMC can undertake are to be implemented, the radio access network does not need to access the 5G core network via the AMF. This reduces a signaling delay.

It should be understood that the communication architecture may include one or more base stations (including the ng-eNB and the gNB).

It should be further understood that the communication architecture may include one or more terminal devices, for example, one or more terminal device sets (the UE set shown in FIG. 2).

One gNB may send data or control signaling to one or more terminal devices. Alternatively, a plurality of gNBs may send data or control signaling to one terminal device.

As described above, in the 5G system or the NR system, an SRS is an uplink reference signal sent by the terminal device. The SRS may be used for positioning, for example, may be used in positioning methods such as a UTDOA positioning method, a UAOA positioning method, an ECID positioning method, and a multi-RTT positioning method. In these positioning methods, the terminal device sends an SRS, and a serving cell and a neighboring cell of the terminal device receive the SRS sent by the terminal device. It should be understood that beam information corresponding to communication between the terminal device and different cells is different. According to a manner of configuring an SRS resource for a terminal device in the conventional technology, when sending an SRS, the terminal device cannot learn of information related to a beam that is of a cell and that is used to receive the SRS. This may affect SRS transmission efficiency.

To address the foregoing problem, the embodiments provide a signal transmission method and an apparatus. When an SRS resource is configured for a terminal device, the SRS resource may be associated with a downlink reference signal of a related cell. For example, the SRS resource may be associated with a downlink reference signal of a neighboring cell. In this way, the terminal device can obtain beam information of the related cell. This improves SRS transmission efficiency, and can improve efficiency of positioning the terminal device.

The terminal device in the embodiments may be user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like.

The network device in the embodiments may be configured to communicate with one or more terminals or may be configured to communicate with one or more base stations having some terminal functions (for example, communication between a macro base station and a micro base station such as an access point). The base station may be an evolved NodeB (eNB) in an LTE system, or a gNB in a 5G system or an NR system. In addition, the base station may also be an access point (AP), a transmission reception point (TRP), a central unit (CU), or another network entity, and may include some or all of the foregoing network entities.

Figure 3:
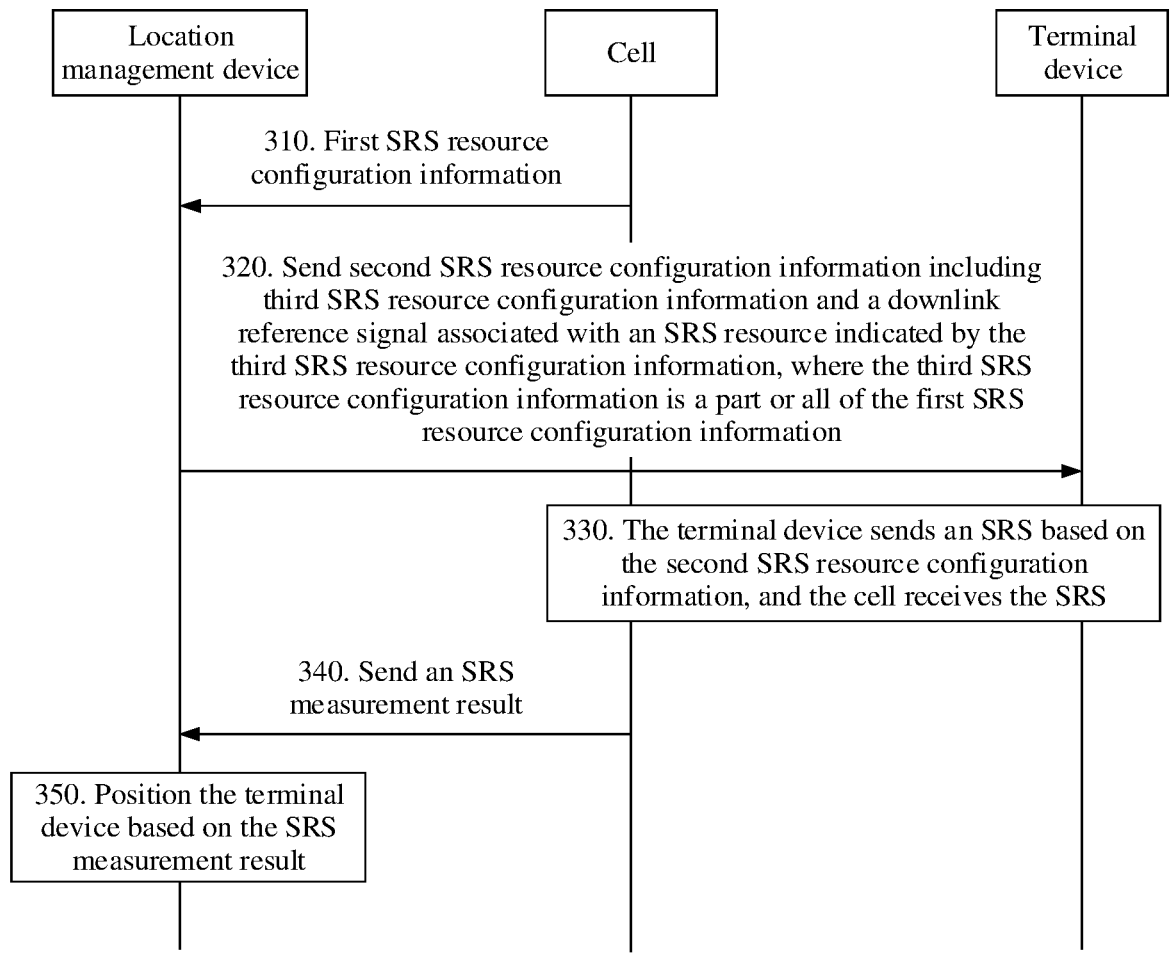
FIG. 3 is a schematic interaction diagram of a signal transmission method according to an embodiment.

FIG. 3 is a schematic interaction diagram of a signal transmission method 300 according to an embodiment. The method 300 includes step 310, step 320, and step 330.

310. A cell sends first SRS resource configuration information to a location management device. Correspondingly, the location management device receives the first SRS resource configuration information from the cell.

There may be one or more cells in this embodiment. For example, there are one or more neighboring cells in this embodiment. For another example, there are one or more serving cells in this embodiment. For another example, there are one or more serving cells and one or more neighboring cells in this embodiment.

In other words, the cell in this embodiment represents all cells that participate in positioning of a terminal device.

The location management device is a network element that can manage a serving cell and a neighboring cell. The location management device may be a part of a core network, or may be integrated into an access network device. For example, the location management device may be the LMF in the core network shown in FIG. 1 or FIG. 2, or may be the LMC integrated into the gNB in FIG. 2. The location management device may also be referred to as a positioning center. A name of the location management device is not limited. In a future evolution technology, another name may be given to the location management device.

The first SRS resource configuration information may include resource configuration information of one or more groups of SRS resources.

For example, the first SRS resource configuration information may include resource configuration information of a plurality of SRSs, and the plurality of SRSs may be sent to a plurality of cells. For example, the first SRS resource configuration information includes resource configuration information of five SRSs, and the five SRSs are separately sent by the terminal device to five different cells.

Resource configuration information of each SRS includes at least information for indicating a time-frequency resource of an SRS resource.

For example, the resource configuration information of each SRS may include the following information: a starting resource block (RB) of the SRS resource; frequency hopping configuration of the SRS resource, including an SRS bandwidth; periodic configuration of the SRS resource, and optionally, for a periodic SRS and a semi-persistent SRS, a periodicity and an offset within the periodicity; and a sequence ID of the SRS resource.

Optionally, the resource configuration information of each SRS may further include any one or more of the following information: an ID of the SRS resource; a quantity of ports of the SRS resource; transmission comb and cyclic shift configuration for the SRS resource; a starting symbol, a quantity of consecutive symbols, and a repetition factor of the SRS resource; and group hopping and sequence hopping of the SRS resource.

320. The location management device sends second SRS resource configuration information to the terminal device, where the second SRS resource configuration information includes third SRS resource configuration information and a downlink reference signal associated with an SRS resource indicated by the third SRS resource configuration information. The downlink reference signal associated with the SRS resource indicated by the third SRS resource configuration information is a downlink reference signal of the cell.

The third SRS resource configuration information is a part or all of the first SRS resource configuration information. In other words, the SRS resource indicated by the third SRS resource configuration information is a part or all of SRS resources indicated by the first SRS resource configuration information. For example, the first SRS resource configuration information includes resource configuration information of five SRSs, and the third SRS resource configuration information includes resource configuration information of three of the five SRSs. For another example, alternatively, some resource configuration information, for example, an SRS bandwidth, in the third SRS resource configuration information may be modified on the basis of the first SRS resource configuration information.

In the third SRS resource configuration information, the resource configuration information of each SRS includes at least information for indicating a time-frequency resource of an SRS resource.

For example, in the third SRS resource configuration information, the resource configuration information of each SRS may include the following information: a starting RB of the SRS resource; frequency hopping configuration of the SRS resource, including an SRS bandwidth; periodic configuration of the SRS resource, and optionally, for a periodic SRS and a semi-persistent SRS, a periodicity and an offset within the periodicity; and a sequence ID of the SRS resource.

Optionally, in the third SRS resource configuration information, the resource configuration information of each SRS may further include any one or more of the following information: an ID of the SRS resource; a quantity of ports of the SRS resource; transmission comb and cyclic shift configuration for the SRS resource; a starting symbol, a quantity of consecutive symbols, and a repetition factor of the SRS resource; or group hopping and sequence hopping of the SRS resource.

In addition to the third SRS resource configuration information, the second SRS resource configuration information sent by the location management device to the terminal device further includes the downlink reference signal associated with the SRS resource indicated by the third SRS resource configuration information (downlink reference signal associated with the SRS resource for short).

The downlink reference signal associated with the SRS resource may be a downlink positioning reference signal of the cell or a synchronization signal/physical broadcast channel (SS/PBCH) block of the cell. The downlink positioning reference signal of the cell may be, for example, a positioning reference signal (PRS) or a channel state information reference signal (CSI-RS). The synchronization signal/physical broadcast channel (SS/PBCH) block of the cell may also be referred to as another cell-specific reference signal (CRS) of the cell.

330. The terminal device sends an SRS based on the second SRS resource configuration information, and the cell receives the SRS.

The terminal device may learn of, based on the second SRS resource configuration information, the SRS resource indicated by the third SRS resource configuration information, that is, a time-frequency resource for sending the SRS.

The terminal device may further learn of, based on the second SRS resource configuration information, the downlink reference signal associated with the SRS resource. The terminal device may determine, based on beam training information or beam information of the downlink reference signal, beam information for receiving the downlink reference signal that is of the cell and that is associated with the SRS resource, and then may learn of, by using a beam correspondence, beam information for sending the SRS, that is, a transmission beam for sending the SRS.

The terminal device sends the SRS based on the determined time-frequency resource for sending the SRS and the beam information for sending the SRS.

The cell may receive the SRS based on the first SRS resource configuration information.

It should be understood that the third SRS resource configuration information is a subset of the first SRS resource configuration information, or the third SRS resource configuration information is the first SRS resource configuration information. Therefore, the cell can receive the SRS sent by the terminal device.

Optionally, the location management device may alternatively send the third SRS resource configuration information to the cell, and the cell may receive the SRS based on the third SRS resource configuration information.

It should be further understood that the terminal device can send the SRS based on the beam information determined based on the downlink reference signal that is of the cell and that is associated with the SRS resource, so that the cell can effectively receive the SRS to some extent. Compared with the conventional technology, this solution can improve SRS transmission efficiency.

Optionally, the location management device may alternatively send, to the cell, the downlink reference signal associated with the SRS resource indicated by the third SRS resource configuration information, and the cell may alternatively determine, based on the downlink reference signal, a reception beam for receiving the SRS.

For example, the cell may determine, based on the beam training information or the beam information of the downlink reference signal, the beam information for receiving the downlink reference signal that is of the cell and that is associated with the SRS resource, and further obtain beam information for receiving the SRS, that is, information about the reception beam for receiving the SRS.

It should be understood that if the terminal device sends the SRS based on the beam information that is determined based on the downlink reference signal associated with the SRS resource, the cell receives the SRS based on the beam information that is determined based on the downlink reference signal associated with the SRS resource. This can effectively improve SRS receiving efficiency of the cell, that is, improve the SRS transmission efficiency.

In the embodiments, the location management device configures the SRS resource for the terminal device. Because the location management device can obtain information related to the downlink reference signal of the cell, the SRS resource can be associated with the downlink reference signal of the cell. For example, when the cell in this embodiment is a neighboring cell of the terminal device, the SRS resource can be associated with a downlink reference signal of the neighboring cell.

Therefore, in the solution of the embodiments, the location management device configures the SRS resource for the terminal device, so that the SRS resource can be associated with the downlink reference signal of the cell. This helps the terminal device obtain the beam information for sending the SRS, and therefore the SRS transmission efficiency can be improved to some extent.

Optionally, in some embodiments, the method 300 further includes step 340 and step 350.

340. The cell measures the received SRS, obtains an SRS measurement result, and sends the SRS measurement result to the location management device.

350. The location management device positions the terminal device based on the SRS measurement result.

It should be understood that according to the embodiments, the SRS transmission efficiency can be improved. That is, the SRS receiving efficiency of the cell can be improved, so that efficiency of sending the SRS measurement result by the cell to the location management device can be improved. Therefore, efficiency of positioning the terminal device by the location management device can be improved.

Therefore, in the embodiments, the location management device configures the SRS resource, so that the SRS resource can be associated with the downlink reference signal of the cell. This helps the terminal device obtain the beam information for sending the SRS. Therefore, the SRS transmission efficiency can be improved to some extent, and further, efficiency of positioning the terminal device can be improved.

For example, in the communication architecture shown in FIG. 1, the location management device is the LMF, and the cell is a cell in which the gNB or the ng-eNB is located. The cell may send the first SRS resource configuration information to the location management device through the NG-C interface by using the NR positioning protocol annex (NRPPa) protocol. The location management device may send the second SRS resource configuration information to the terminal device by using the LPP/NPP protocol.

For another example, in the communication architecture shown in FIG. 2, the cell is a cell in which the gNB or the ng-eNB is located, and the location management device is the LMC in the gNB. If the cell is a cell in which the ng-eNB is located, the cell may send the first SRS resource configuration information of the cell to the location management device through the Xn interface. If the cell is a cell in which the gNB is located, the cell may send the first SRS resource configuration information of the cell to the location management device through an interface between internal modules of the gNB. The location management device may send the second SRS resource configuration information to the terminal device through the NR-Uu interface.

It should be noted that the cell in this embodiment represents a network device in the cell, for example, a base station. For example, for a description similar to "a cell sends a message/information" or "a cell receives a message/information", the cell represents a network device in the cell, for example, a base station in the cell. For example, in step 310, that the cell sends the first SRS resource configuration information to the location management device means that a network device (for example, a base station) in the cell sends the first SRS resource configuration information to the location management device. For another example, in step 502 described below, that the serving cell and the neighboring cells receive the SRS resource request message sent by the location management device means that a network device in the serving cell and network devices in the neighboring cells receive the SRS resource request message sent by the location management device, and may also be expressed as that a serving base station and neighboring base stations receive the SRS resource request message sent by the location management device.

Optionally, in some embodiments, the downlink reference signal associated with the SRS resource indicated by the third SRS resource configuration information may include a downlink reference signal associated with each of a plurality of SRS resources of the cell.

Optionally, in some embodiments, the downlink reference signal associated with the SRS resource indicated by the third SRS resource configuration information may be a common downlink reference signal associated with an SRS resource set including a plurality of SRS resources of the cell.

Optionally, in some embodiments, the downlink reference signal associated with the SRS resource indicated by the third SRS resource configuration information may be used by the terminal device to determine beam information of the cell, and may be further used by the terminal device to determine a downlink timing of the cell.

For differentiation, the second SRS resource configuration information may carry two types of downlink reference signals. One type is used to determine the beam information of the cell, and the other type is used to determine the downlink timing of the cell.

Optionally, in some embodiments, in addition to the third SRS resource configuration information and the downlink reference signal associated with the SRS resource indicated by the third SRS resource configuration information, the second SRS resource configuration information further includes spatial relationship information of the SRS resource indicated by the third SRS resource configuration information. The spatial relationship information may also be expressed as spatial filter information, and is used for indicating beam information for sending the SRS.

The downlink reference signal that is of the cell and that is associated with the SRS resource indicated by the third SRS resource configuration information (downlink reference signal associated with the SRS resource for short) is used by the terminal device to determine the downlink timing of the cell, and the spatial relationship information of the SRS resource indicated by the third SRS resource configuration information (spatial relationship information of the SRS resource for short) is used by the terminal device to determine the beam information of the cell.

The downlink reference signal associated with the SRS resource may be a downlink positioning reference signal of the cell or another cell-specific reference signal of the cell. The downlink positioning reference signal of the cell includes a CSI-RS, and the another cell-specific reference signal of the cell includes an SS/PBCH block.

The spatial relationship information of the SRS resource may be a downlink positioning reference signal of the cell or another cell-specific reference signal of the cell. The downlink positioning reference signal of the cell includes a CSI-RS, and the another cell-specific reference signal of the cell includes an SS/PBCH block.

The downlink reference signal associated with the SRS resource may be a downlink reference signal in the spatial relationship information of the SRS resource, and is not independently configured any more. Alternatively, a downlink reference signal in the spatial relationship information of the SRS resource may be the downlink reference signal associated with the SRS resource, and is not independently configured any more.

The spatial relationship information of the SRS resource in the embodiments may correspond to an uplink reference signal or may correspond to a downlink reference signal.

When the spatial relationship information of the SRS resource corresponds to an uplink reference signal, the terminal device may use a transmission beam of the reference signal corresponding to the spatial relationship information of the SRS resource as the transmission beam for sending the SRS. The cell may use a reception beam of the reference signal corresponding to the spatial relationship information of the SRS resource as a reception beam for receiving the SRS. When the spatial relationship information of the SRS resource corresponds to a downlink reference signal, the terminal device may use a reception beam of the reference signal corresponding to the spatial relationship information of the SRS resource as the transmission beam for sending the SRS. The cell may use a transmission beam of the reference signal corresponding to the spatial relationship information of the SRS resource as a reception beam for receiving the SRS. The cell herein represents a network device in the cell, for example, a base station.

The spatial relationship information of the SRS resource in the embodiments may also be referred to as spatial filter information of the SRS resource.

The location management device configures the spatial relationship information of the SRS resource for the terminal device. This helps the terminal device obtain the transmission beam for sending the SRS, and therefore improves SRS transmission efficiency.

Optionally, in some embodiments, the second SRS resource configuration information delivered by the location management device to the terminal device may further include an uplink timing advance TA of the cell.

For example, the second SRS resource configuration information includes the third SRS resource configuration information, the downlink reference signal that is of the cell and that is associated with the SRS resource indicated by the third SRS resource configuration information, the spatial relationship information of the SRS resource indicated by the third SRS resource configuration information, and the uplink TA of the cell.

For example, the uplink TA of the cell may be 6 bits or 12 bits. A function of a 6-bit TA is equivalent to a function of a media access control-control element (MAC-CE) TA command. In this case, the TA command indicates an adjustment of the terminal relative to the current uplink TA. A function of a 12-bit TA is equivalent to a function of a MAC CE TA command in a random access response (RAR). In this case, the TA command indicates an adjustment of the terminal relative to the downlink timing.

It should be understood that for one cell, the terminal device may determine, based on a downlink timing of the cell and an uplink TA of the cell, an SRS uplink timing corresponding to the cell.

Figure 4:
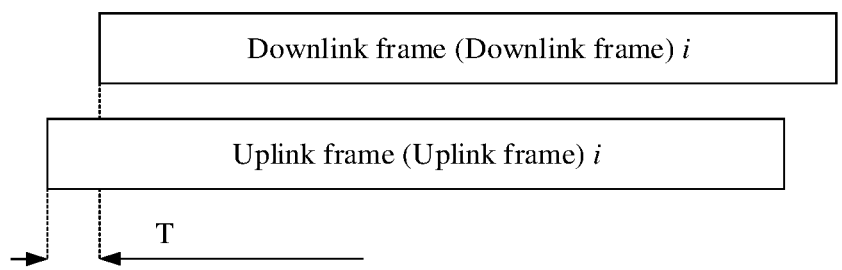
FIG. 4 is a schematic diagram of determining an SRS transmission timing according to an embodiment.

As shown in FIG. 4, when sending each SRS, the terminal device determines an SRS transmission timing T based on a reception timing of a cell corresponding to a downlink reference signal associated with an SRS resource corresponding to the SRS and based on an uplink TA of the cell.

For example, the SRS transmission timing T is determined according to the following formula:

$$T = (N_{TA} + N_{TA,offset}) \cdot T_C.$$

$N_{TA}$ represents a TA determined based on a TA command. When the TA is 6 bits, the TA is calculated according to a formula $N_{TA\_new} = N_{TA\_old} + (T_A - 31) \cdot 16 \cdot 64/2^\mu$, that is, $N_{TA} = N_{TA\_new}$, where $N_{TA\_old}$ is $N_{TA}$ before the TA command is received. When the TA is 12 bits, the TA is calculated according to a formula $N_{TA} = T_A \cdot 16 \cdot 64/2^\mu$.

$\mu$ is a subcarrier spacing of the SRS. Examples are shown in Table 1.

TABLE 1

| μ | Subcarrier spacing (kHz) |
|---|---|
| 0 | 15 |
| 1 | 30 |
| 2 | 60 |
| 3 | 120 |
| 4 | 240 |

$N_{TA,offset}$ represents a fixed offset and is determined in Table 2 as an example.

TABLE 2

| Frequency range and frequency band of cell used for uplink transmission | $N_{TA,\ offset}$ (Unit: $T_C$) |
|---|---|
| Low frequency band (FR1) FDD band without LTE-NR coexistence case, or low frequency band (FR1) TDD band without LTE-NR coexistence case | 25600 |
| Low frequency band (FR1) FDD band with LTE-NR coexistence case | 0 |
| Low frequency band (FR1) TDD band with LTE-NR coexistence case | 39936 |
| High frequency band (FR2) | 13792 |

$T_C$ indicates a basic time unit defined in NR. For example, in the current protocol, a value of $T_C$ is $1/(480000*4096)$s.

In this embodiment, after receiving the second SRS resource configuration information configured by the location management device, the terminal device may obtain the downlink timing of the cell based on the downlink reference signal that is of the cell and that is associated with the SRS resource, and may further learn of the uplink TA of the cell. Then, the terminal device obtains the SRS uplink timing of the cell based on the downlink timing of the cell and the uplink TA of the cell, so that the SRS may be sent based on the SRS uplink timing.

When the cell is a neighboring cell of the terminal device, in this embodiment, the terminal device may synchronize the sending of the SRS to an uplink carrier of the neighboring cell, to avoid interference to an original uplink of the neighboring cell.

When the cell is a serving cell of the terminal device, in this embodiment, the terminal device may synchronize the sending of the SRS to an uplink carrier of the serving cell, to avoid interference to an original uplink of the serving cell.

It should be understood that, when there are (one or more) serving cells and (one or more) neighboring cells of the terminal device, in this embodiment, the terminal device may separately obtain an SRS uplink timing 1 for the serving cell and an SRS uplink timing 2 for the neighboring cell. Then, an SRS sent based on the SRS uplink timing 1 may be synchronized to an uplink carrier of the serving cell, and an SRS sent based on the SRS uplink timing 2 may be synchronized to an uplink carrier of the neighboring cell.

Optionally, in this embodiment, the uplink TA of the cell is obtained by the location management device based on an estimated location of the terminal device and a location of the cell.

The location management device may obtain the estimated location of the terminal device in a plurality of manners. The location management device may determine the estimated location of the terminal device based on information obtained in any one of the following manners or information obtained in a combination of a plurality of manners.

(1) Measurement information that is obtained based on any one of the following manners and that is reported by the terminal device or location information that is determined based on any one of the following manners and that is reported by the terminal device is received: a global navigation satellite system (GNSS), Bluetooth, a wireless local area network (WLAN), barometers, sensors, and the like.

(2) Location information that is reported by the terminal device and that is determined by the terminal device in a manner such as an observed time difference of arrival (OTDOA) or an E-CID manner, or reference signal measurement information that is reported by the terminal device and that is used in the manner such as the OTDOA or the E-CID manner is received.

(3) Reference signal measurement information that is obtained by the network device (a location measurement unit or a base station) and that is used in a manner such as a UTDOA or an E-CID manner.

It should be understood that the location of the cell is known to the location management device. The location of the cell refers to a location of a base station in the cell.

Optionally, the uplink TA of the cell may be obtained in another feasible manner. A manner of obtaining the uplink TA of the cell is not limited in the embodiments.

Optionally, in some embodiments, the location management device configures an uplink TA of only the neighboring cell for the terminal device. It should be understood that the terminal device may obtain an uplink TA of a current serving cell based on a TA of the serving cell.

Optionally, in some embodiments, the second SRS resource configuration information delivered to the terminal device may not include the uplink TA of the cell, and the serving cell may configure the uplink TA for the terminal device. In other words, the terminal device may calculate the SRS uplink timing of the cell based on the uplink TA of the serving cell and the downlink reference signal that is of the cell and that is associated with the SRS resource carried in the second SRS resource configuration information.

For one cell, the location management device determines, based on configuration information of a downlink reference signal of the cell and a result of measuring the downlink reference signal of the cell by the terminal device, a downlink reference signal that is of the cell and that is associated with an SRS resource.

Optionally, in some embodiments, the method 300 further includes: the location management device obtains configuration information of the downlink reference signal of the cell and a result of measuring the downlink reference signal of the cell by the terminal device.

The downlink reference signal of the cell may include the downlink positioning reference signal of the cell and/or another cell-specific reference signal of the cell.

The downlink positioning reference signal of the cell is, for example, a CSI-RS. The another cell-specific reference signal of the cell is, for example, an SS/PBCH block.

Configuration information of the downlink positioning reference signal of the cell includes time domain information, frequency domain information, sequence information, and spatial information of the downlink positioning reference signal of the cell.

Configuration information of the another cell-specific reference signal of the cell includes time domain information, frequency domain information, and sequence information of the SS/PBCH block of the cell.

The result of measuring the downlink reference signal of the cell by the terminal device includes any one or more of the following measurement quantities of the downlink reference signal of the cell: a reference signal received power (RSRP), reference signal received quality (RSRQ) or a reference signal time difference of arrival (RSTD).

The location management device may indicate the cell to report the configuration information of the downlink reference signal of the cell, or may further indicate the terminal device to report the result of measuring the downlink reference signal of the cell.

For example, in the communication architecture shown in FIG. 1, the location management device is the LMF, and the cell is a cell in which the gNB or the ng-eNB is located. The cell may report the configuration information of the downlink reference signal of the cell to the LMF through an NG-C interface by using the NRPPa protocol. The terminal device may report the result of measuring the downlink reference signal of the cell to the LMF directly by using the LPP/NPP protocol. Alternatively, the terminal device reports the result of measuring the downlink reference signal of the cell to the LMF via the serving cell based on the NRPPa protocol.

For another example, in the communication architecture shown in FIG. 2, the cell is a cell in which the gNB or the ng-eNB is located, and the location management device is the LMC in the gNB. If the cell is a cell in which the ng-eNB is located, the cell may send the configuration information of the downlink reference signal of the cell to the LMC through the Xn interface. If the cell is a cell in which the gNB is located, the cell may send the configuration information of the downlink reference signal of the cell to the LMC through an interface between internal modules of the gNB. The terminal device may send the result of measuring the downlink reference signal of the cell to the LMC through the NR-Uu interface.

The location management device determines, based on configuration information of the downlink reference signal of the cell and the result of measuring the downlink reference signal of the cell by the terminal device, the downlink reference signal that is of the cell and that is associated with the SRS resource. For example, the location management device selects a downlink reference signal with a highest reference signal received power (RSRP) in the downlink reference signals of the cell as the downlink reference signal associated with the SRS resource. For another example, the location management device selects a downlink reference signal with best reference signal received quality (RSRQ) in the downlink reference signals of the cell as the downlink reference signal associated with the SRS resource.

The first SRS resource configuration information sent by the cell to the location management device in step 310 may be specified in a protocol, triggered by an event, or requested by the location management device.

Optionally, in some embodiments, step 310 includes: the location management device sends an SRS resource request message to the cell. The cell sends the first SRS resource configuration information to the location management device based on the SRS resource request message.

The location management device may request the SRS resource configuration information from the cell in a plurality of manners.

An example in which the location management device needs to request SRS resource configuration information from a plurality of cells is used for description below.

Optionally, in an implementation, the location management device separately requests SRS resource configuration information from the plurality of cells.

For example, in the scenario shown in FIG. 1 or FIG. 2, the location management device is the LMF, and the LMF requests SRS resource configuration information from the plurality of cells by using the NRPPa protocol.

In this implementation, for each cell in the plurality of cells, to-be-reported SRS resource configuration information is determined, and then the determined SRS resource configuration information is reported to the location management device.

In this implementation, the plurality of cells may include a plurality of neighboring cells. Alternatively, the plurality of cells may include a plurality of serving cells. Alternatively, the plurality of cells include one or more serving cells and one or more neighboring cells.

Optionally, in another implementation, the location management device sends, to one cell (denoted as a cell A) in the plurality of cells, a request message used to request SRS resource configuration information of the plurality of cells, where the request message carries information about the other cells in the plurality of cells except the cell A. For example, the request message carries a cell list of the other cells.

For example, in the scenario shown in FIG. 1 or FIG. 2, the location management device is the LMF, and the LMF sends the request message to the cell A by using the NRPPa protocol.

In this implementation, the cell A separately requests SRS resource configuration information from the other cells based on the request message. The other cells separately send resource configuration information of one or more groups of SRS resources to the cell A. The cell A indicates each of the other cells to select resource configuration information of an SRS resource from the SRS resources provided by the other cells, for reporting. Each of the other cells sends SRS resource configuration information of the cell to the location management device according to the indication of the cell A. The cell A itself determines to-be-reported SRS resource configuration information, and sends the SRS resource configuration information of the cell A to the location management device.

In this implementation, the cell A communicates with the other cells through Xn interfaces.

In this implementation, the SRS resource configuration information to be reported by each of the plurality of cells to the location management device is determined by the cell A. It may be understood that, that the cell A centrally determines the SRS resource configuration information reported by the plurality of cells helps implement interference coordination between cells, and further helps prevent a case in which a sending task of the terminal device is over a sending capability of the terminal device. That is, the terminal device may be prevented from simultaneously sending a plurality of SRS resources beyond a capability of the terminal device.

Optionally, in this implementation, the cell A is a serving cell of the terminal device.

Therefore, in this embodiment, one cell determines the SRS resource configuration information separately sent by the plurality of cells to the location management device. This helps implement interference coordination between the cells, and further helps prevent the terminal device from sending more SRS resources than the capability of the terminal device permits at the same moment.

Optionally, in some embodiments, if in step 320, the second SRS resource configuration information sent by the location management device to the terminal device further includes the spatial relationship information of the SRS resource indicated by the third SRS resource configuration information, the method 300 further includes: the location management device sends the third SRS resource configuration information and the spatial relationship information of the SRS resource indicated by the third SRS resource configuration information to the cell.

It should be understood that the cell receives the spatial relationship information that is of the SRS resource indicated by the third SRS resource configuration information and that is sent by the location management device. In this way, the cell may determine, based on beam information of a reference signal corresponding to the spatial relationship information of the SRS resource, a reception beam for receiving the SRS by the cell.

For example, when the spatial relationship information of the SRS resource corresponds to an uplink reference signal, the cell may use a reception beam of the reference signal corresponding to the spatial relationship information of the SRS resource as the reception beam for receiving the SRS. When the spatial relationship information of the SRS resource corresponds to a downlink reference signal, the cell may use a transmission beam of the reference signal corresponding to the spatial relationship information of the SRS resource as a reception beam for receiving the SRS.

Therefore, the location management device sends, to the terminal device and the cell separately, the spatial relationship information of the SRS resource indicated by the third SRS resource configuration information, so that the terminal device and the cell can obtain information about a beam between the terminal device and the cell, and further perform SRS transmission based on the information about the beam. SRS transmission efficiency can be improved, and efficiency of positioning the terminal device can be improved.

As described above, the SRS may be used for positioning, for example, may be used in UTDOA, UAOA, ECID, and multi-RTT positioning methods and the like. For details, see the following figure.

In the UTDOA positioning method, a terminal device sends an SRS, a base station (including a serving cell and a neighboring cell) receives the SRS and measures an uplink time difference of arrival of the SRS, and a positioning center determines a location of the terminal device based on the time difference of arrival of the SRS received by different base stations.

In the UAOA positioning method, a terminal device sends an SRS, a base station (including a serving cell and a neighboring cell) receives the SRS and measures an uplink angle of arrival of the SRS, and a positioning center determines a location of the terminal device based on the angle of arrival of the SRS received by different base stations.

In the E-CID positioning method, a terminal device measures a terminal device Rx-Tx time difference for a serving cell, and a base station measures a/an eNB/gNB Rx-Tx time difference of the terminal device based on an uplink signal/channel, for example, an SRS. A positioning center calculates an RTT based on the terminal device Rx-Tx time difference and the eNB/gNB Rx-Tx time difference. In combination with an uplink angle of arrival obtained based on an uplink signal/channel such as an SRS, the positioning center determines a distance between the terminal device and the base station, and determines a location of the UE.

In the multi-RTT positioning method, a network side obtains an RTT between a terminal device and a plurality of cells in a manner similar to obtaining the RTT in the E-CID positioning method, to determine a location of the terminal device.

In the embodiments, the location management device may send an SRS measurement request message to the cell.

Optionally, in some embodiments, before step 340, the method 300 further includes: The location management device sends the SRS measurement request message to the cell.

The SRS measurement request message may include a measurement type, where the measurement type includes any one or more of the following: SRS reception time information (corresponding to the UTDOA positioning method), SRS reception angle information (corresponding to the UAOA positioning method), or an SRS-based Rx-Tx time difference (which may correspond to the E-CID positioning method or the multi-RTT positioning method).

Optionally, in some embodiments, the SRS measurement request message includes the third SRS resource configuration information.

Alternatively, in some embodiments, the SRS measurement request message includes the third SRS resource configuration information and the spatial relationship information of the SRS resource indicated by the third SRS resource configuration information.

As described above, the third SRS resource configuration information is sent to the cell, so that the cell can receive the SRS based on the third SRS resource configuration information. The spatial relationship information of the SRS resource indicated by the third SRS resource configuration information is sent to the cell, so that the cell can determine, based on the downlink reference signal, the reception beam for receiving the SRS. In this way, SRS receiving efficiency of the cell can be effectively improved. That is, the SRS transmission efficiency is improved.

In addition, the SRS measurement request message carries the third SRS resource configuration information and the spatial relationship information of the SRS resource, so that signaling overheads can be reduced to some extent.

It should be understood that the location management device may alternatively send the third SRS resource configuration information and the spatial relationship information of the SRS resource to the cell by using other signaling.

Optionally, in this embodiment, in step 340, the cell measures the SRS according to the SRS measurement request message, obtains the SRS measurement result, and sends the SRS measurement result to the location management device.

For example, when the measurement type is SRS reception time information, the SRS measurement result includes SRS reception time information, for example, an RTOA.

For another example, when the measurement type is SRS reception angle information, the SRS measurement result includes SRS reception angle information, for example, an angle of arrival in a horizontal direction and an angle of arrival in a vertical direction of the SRS.

For another example, when the measurement type is an SRS-based Rx-Tx time difference, the SRS measurement result includes an SRS-based Rx-Tx time difference, where a reception time point is an SRS uplink frame timing, and a transmission time point is a downlink frame timing of the downlink reference signal associated with the SRS.

Optionally, in the embodiments, a state in which the terminal device sends the SRS may be a connected state (RRC_CONNECTED state), an idle state (RRC_IDLE state), or an inactive state (RRC_INACTIVE state).

It should be understood that, in the conventional technology, a serving base station configures an SRS resource for a terminal device by using an RRC message. When the terminal device enters the RRC_IDLE state or the RRC_INACTIVE state, RRC connection of the terminal device is released, and all of a reference signal (including an SRS)

configured by using the RRC message are released. In other words, the SRS resource configured according to the conventional technology no longer exist when the terminal device enters the RRC_IDLE state or the RRC_INACTIVE state.

In the embodiments, the location management device is used to configure the SRS resource for the terminal device. For example, the location management device may configure the SRS resource for the terminal device by using the LPP/NPP protocol. Therefore, provided that the location management device configures the SRS resource for the terminal device, even if the terminal device enters the RRC_IDLE state or the RRC_INACTIVE state, the SRS resource configured for the terminal device is not released. Therefore, this embodiment can overcome a problem in the conventional technology that a configured SRS resource no longer exists when the terminal device enters the RRC_IDLE state or the RRC_INACTIVE state.

Optionally, in some embodiments, the method 300 further includes: the terminal device reports, to the location management device, a difference between a reception time point and a transmission time point for the cell, where the reception time point is the downlink frame timing of the downlink reference signal associated with the SRS resource indicated by the third SRS resource configuration information, and the transmission time point is the uplink frame timing at which the terminal device sends the SRS.

Optionally, the location management device may request the terminal device to report the foregoing information.

For example, the location management device sends a location request message to the terminal device, and the terminal device sends a location response message to the location management device. The location response message includes the difference between the reception time point and the transmission time point for the cell.

It should be understood that the difference that is between the reception time point and the transmission time point for the cell and that is reported by the terminal device is received. This helps the location management device improve accuracy of positioning the terminal device.

It may be understood that, if the cells in the embodiments include (one or more) serving cells and (one or more) neighboring cells, in some embodiments, the location management device sends the SRS measurement request message to the serving cell and the neighboring cell separately. The serving cell and the neighboring cell separately report SRS measurement results of the SRS to the location management device. In some embodiments, the location management device receives a difference between a reception time point and a transmission time point for the serving cell and a difference between a reception time point and a transmission time point for the neighboring cell reported by the terminal device.

It can be understood from the foregoing descriptions that in this embodiment, the location management device configures the SRS resource for the terminal device, so that the SRS resource can be associated with the downlink reference signal of the cell. This helps the terminal device obtain information about the transmission beam for sending the SRS, and therefore SRS receiving efficiency of the cell can be improved to some extent.

Figure 5:
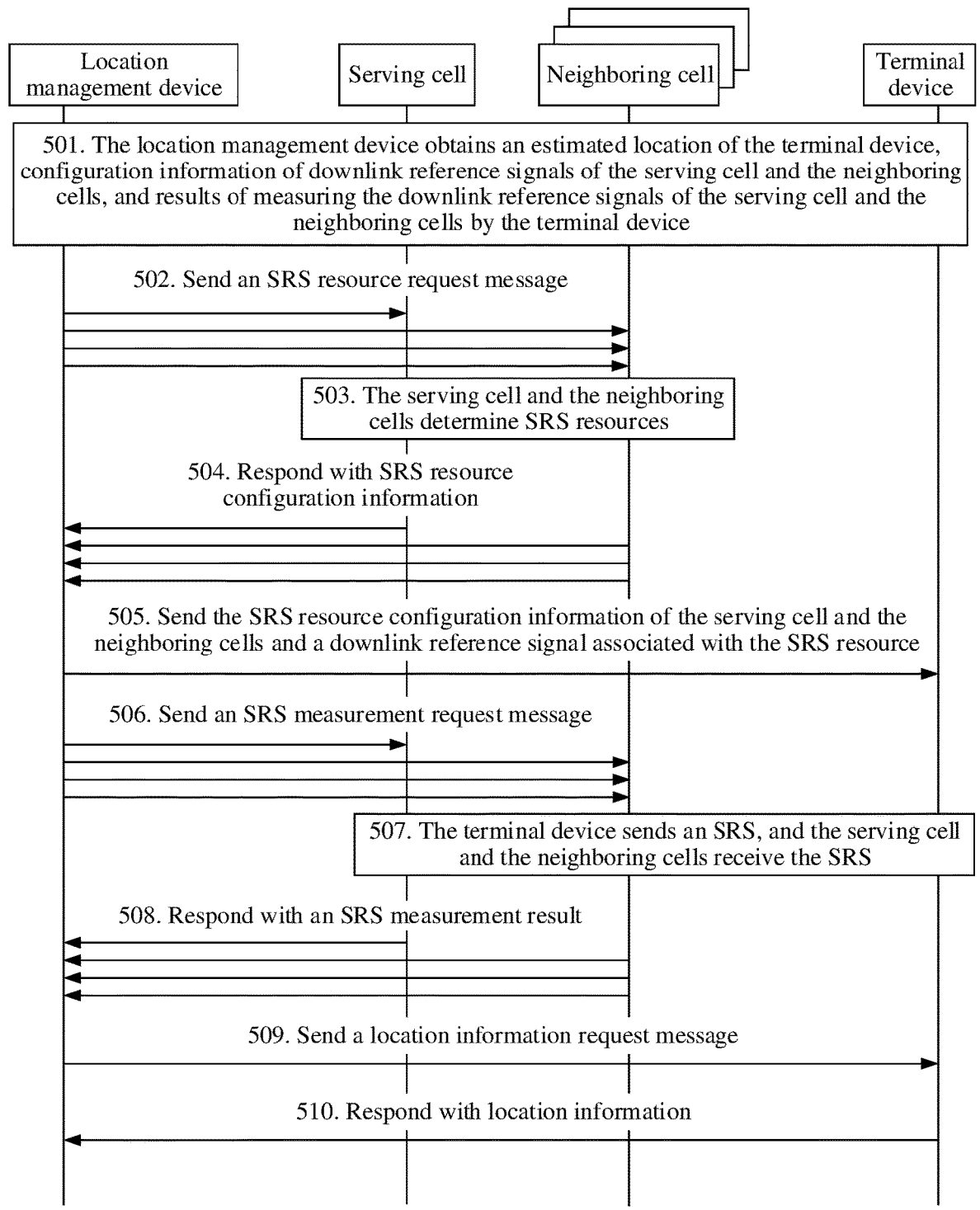
FIG. 5 is another schematic interaction diagram of a signal transmission method according to an embodiment.

The following describes an implementation procedure of a signal transmission method 500 according to an embodiment with reference to FIG. 5. In FIG. 5, an example in which cells include one serving cell and a plurality of neighboring cells is used for description. As shown in FIG. 5, the method 500 includes the following steps.

501. A location management device obtains an estimated location of a terminal device, configuration information of downlink reference signals of the serving cell and the neighboring cells, and results of measuring the downlink reference signals of the serving cell and the neighboring cells by the terminal device.

The downlink reference signals of the serving cell and the neighboring cells include a downlink positioning reference signal or another cell-specific reference signal, where the downlink positioning reference signal is, for example, a CSI-RS, and the another cell-specific reference signal is, for example, an SS/PBCH block.

For a specific implementation of step 501, refer to the foregoing related descriptions. For brevity, details are not described herein again.

502. The location management device sends an SRS resource request message to the serving cell and the neighboring cells, where the SRS resource request message information is used to request SRS resource configuration information (information request).

Optionally, the location management device separately sends the request message to the serving cell and the neighboring cells.

Optionally, the location management device sends the request message to one cell (denoted as a cell A) in the serving cell and the neighboring cells, where the request message carries information for indicating the other cells in the serving cell and the neighboring cells except the cell A. For example, the request message carries a cell list of the other cells.

503. The serving cell and the neighboring cells determine SRS resources.

If in step 502, the location management device separately sends the request message to the serving cell and the neighboring cells, the serving cell and the neighboring cells determine SRS resources independently in step 503.

If in step 502, the location management device sends the request message to the cell A in the serving cell and the neighboring cells, where the request message carries the information for indicating the other cells in the serving cell and the neighboring cells except the cell A, the cell A may coordinate an SRS resource with the other cells through XnAP interfaces in step 503.

A coordination manner may include the following steps:

Step (1): The cell A requests the other cells to provide resource configuration information of one or more groups of SRS resources.

Step (2): The other cells each provide the cell A with the resource configuration information of the one or more groups of SRS resources.

Step (3): The cell A indicates each of the other cells to select an SRS resource from provided SRS resources.

It should be understood that, the cell A coordinates the SRS resource with the serving cell and the neighboring cells, facilitating inter-cell interference coordination, and further helping prevent the terminal device from simultaneously sending a plurality of SRS resources beyond a capability of the terminal device.

Optionally, the cell A is a serving cell.

It should be understood that the cell A may alternatively be a neighboring cell.

504. The serving cell and the neighboring cells send the SRS resource configuration information to the location management device.

The serving cell sends SRS resource configuration information to the location management device based on the SRS resource determined in step 503. The neighboring cells each send SRS resource configuration information to the location management device based on the SRS resource determined in step 503.

For example, the SRS resource configuration information may include some, or all, of the following information:

an ID of the SRS resource; a quantity of ports of the SRS resource; transmission comb and cyclic shift configuration for the SRS resource; a starting symbol, a quantity of consecutive symbols, and a repetition factor of the SRS resource; a starting RB of the SRS resource; frequency hopping configuration of the SRS resource, including an SRS bandwidth; group hopping and sequence hopping of the SRS resource; periodic configuration of the SRS resource, and optionally, for a periodic SRS and a semi-persistent SRS, a periodicity and an offset within the periodicity; and a sequence ID of the SRS resource.

It should be understood that each cell in the serving cell and the neighboring cells may send resource configuration information of one or more SRS resources to the location management device.

For example, step 504 may correspond to step 310 in the foregoing embodiment.

505. The location management device obtains SRS resource configuration information of each cell in the serving cell and the neighboring cells and a downlink reference signal associated with the SRS resource.

The SRS resource configuration information of each cell in step 505 may be the SRS resource configuration information sent by a corresponding cell to the location management device in step 504, or may be a subset of the SRS resource configuration information sent by the corresponding cell to the location management device in step 504.

For example, SRS resource configuration information sent by a cell 1 to the location management device in step 504 includes resource configuration information of five SRS resources. Resource configuration information that is of the cell 1 and that is sent by the location management device to the terminal device in step 505 includes resource configuration information of three of the five SRS resources. For another example, alternatively, some configuration information, for example, an SRS bandwidth, in resource configuration information that is of a cell 1 and that is sent by the location management device to the terminal device in step 505 may be modified on the basis of SRS resource configuration information sent by the cell 1 to the location management device in step 504.

For example, each piece of the SRS resource configuration information sent in step 505 includes some or all of the following information:

an ID of the SRS resource; a quantity of ports of the SRS resource; transmission comb and cyclic shift configuration for the SRS resource; a starting symbol, a quantity of consecutive symbols, and a repetition factor of the SRS resource; a starting RB of the SRS resource; frequency hopping configuration of the SRS resource, including an SRS bandwidth; group hopping and sequence hopping of the SRS resource; periodic configuration of the SRS resource, and optionally, for a periodic SRS and a semi-persistent SRS, a periodicity and an offset within the periodicity; and a sequence ID of the SRS resource.

In step 505, in addition to the SRS resource configuration information, the location management device further sends, to the terminal device, the downlink reference signal associated with the SRS resource of each cell.

The cell 1 in the serving cell and the neighboring cells is used as an example. The downlink reference signal associated with the SRS resource may be a downlink positioning reference signal of the cell 1 or another cell-specific reference signal of the cell 1. The downlink positioning reference signal of the cell 1 is, for example, a CSI-RS, and the another cell-specific reference signal of the cell 1 is, for example, an SS/PBCH block.

Optionally, the downlink reference signal that is associated with the SRS resource of each cell and that is sent in step 505 may be a common downlink reference signal associated with an SRS resource set including a plurality of SRS resources of the cell.

For the cell 1, the downlink reference signal associated with the SRS resource is used by the terminal device to determine information about a beam between the terminal device and the cell 1.

Optionally, for the cell 1, the downlink reference signal associated with the SRS resource may be further used by the terminal device to determine an SRS transmission timing for the cell 1.

Optionally, in step 505, the location management device may further send spatial relationship information of the SRS resource of each cell to the terminal device.

The cell 1 in the serving cell and the neighboring cells is still used as an example. The spatial relationship information of the SRS resource may be a downlink positioning reference signal of the cell 1 or another cell-specific reference signal of the cell 1.

The cell 1 in the serving cell and the neighboring cells is still used as an example. The downlink reference signal associated with the SRS resource may be a downlink reference signal in the spatial relationship information of the SRS resource, and is not independently configured any more. Alternatively, a downlink reference signal in the spatial relationship information of the SRS resource may be the downlink reference signal associated with the SRS resource, and is not independently configured any more.

Optionally, in step 505, the location management device may further send an uplink TA of each cell to the terminal device.

It should be understood that, in step 505, after receiving the information sent by the location management device, the terminal device may obtain resource location information of the SRS resource based on the SRS resource configuration information, obtain a downlink timing of each cell based on the downlink reference signal associated with the SRS resource, obtain beam information of each cell based on the spatial relationship information of the SRS resource, and further obtain the uplink TA of each cell. The cell 1 is still used as an example. The terminal device obtains an SRS uplink timing of the cell 1 based on a downlink timing and an uplink TA of the cell 1, and then sends an SRS based on the SRS uplink timing. In this way, the sending of the SRS can be synchronized to an uplink carrier of the cell 1. This can avoid relatively large interference caused by the sending of the SRS to normal uplink of the cell 1.

Optionally, in step 505, in a process of sending the uplink TA of each cell to the terminal device, the location management device may send only the uplink TAs of the neighboring cells, but does not send the uplink TA of the serving cell. This is because the terminal device may obtain the uplink TA of the serving cell from the serving cell.

506. The location management device sends an SRS measurement request message to each cell in the serving cell and the neighboring cells, where the SRS measurement request message is used to request SRS measurement.

For example, the SRS measurement request message includes a measurement type, where the measurement type includes any one or more of the following: SRS reception time information, SRS reception angle information, or an SRS-based Rx-Tx time difference.

Optionally, in an implementation, each cell may receive an SRS on the SRS resource determined in step 503.

Optionally, in another implementation, the SRS measurement request message of each cell further includes SRS resource configuration information of the cell. The SRS resource configuration information sent by the location management device to each cell may be the same as the SRS resource configuration information of the corresponding cell sent to the terminal device in step 505.

In this implementation, each cell determines the SRS resource based on the SRS resource configuration information carried in the SRS measurement request message sent by the location management device, and receives the SRS on a time-frequency resource determined based on the SRS resource configuration information.

Optionally, the SRS measurement request message of each cell may further include the spatial relationship information of the SRS resource.

Each cell may use a transmission beam of a reference signal corresponding to the spatial relationship information that is of the SRS resource and that is carried in the SRS measurement request message sent by the location management device as a reception beam for receiving the SRS.

507. The terminal device sends the SRS, and the serving cell and the neighboring cells receive the SRS.

The terminal device determines, based on the SRS resource configuration information received in step 505, the time-frequency resource used to send the SRS.

When sending each SRS, the terminal device determines an uplink timing T of the SRS based on a reception timing of a cell corresponding to a downlink reference signal associated with an SRS resource corresponding to the SRS and an uplink TA of the cell, as shown in FIG. 4.

A state in which the terminal device sends the SRS may be a connected state (RRC_CONNECTED), an idle state (RRC_IDLE), or an inactive state (RRC_INACTIVE).

508. The serving cell and the neighboring cells each send an SRS measurement result to the location management device.

For example, the SRS measurement result may include any one or more of the following:

SRS reception time information, for example, an RTOA;

SRS reception angle information, such as an angle of arrival in a horizontal direction and an angle of arrival in a vertical direction; and an SRS-based Rx-Tx time difference, where a reception time point is an SRS uplink frame timing, and a transmission time point is a downlink frame timing of the downlink reference signal associated with the SRS.

Optionally, the method 500 may further include the following steps.

509. The location management device sends a location information request message to the terminal device.

The location information request message is used to request the terminal device to report an Rx-Tx time difference of each cell in the serving cell and the neighboring cells, where a reception time point is a downlink frame timing of the downlink reference signal associated with the SRS, and a transmission time point is an SRS uplink frame timing.

510. The terminal device reports location information to the location management device.

The location information reported by the terminal device includes: the Rx-Tx time difference that is of each cell in the serving cell and the neighboring cells and that is reported by the terminal device, where the reception time point is the downlink frame timing of the downlink reference signal associated with the SRS, and the transmission time point is the SRS uplink frame timing.

For example, the terminal device sends a location information response message to the location management device, where the location information response message includes the location information.

It should be understood that the embodiment shown in FIG. 5 may be applied to the communication architecture shown in FIG. 1 or FIG. 2.

For example, in the communication architecture in FIG. 1 or FIG. 2, the location management device is the LMF, the serving cell is a cell in which the gNB is located, and the neighboring cell is a cell in which the ng-eNB is located. For example, in step 502, step 504, step 506, and step 508, the location management device may communicate with the serving cell and the neighboring cells by using the NRPPa protocol. For another example, in step 505, step 509, and step 510, the location management device communicates with the terminal device by using the LPP/NPP protocol. For another example, in step 503, the serving cell may communicate with the neighboring cells through XnAP interfaces. For another example, in step 507, the terminal device communicates with the serving cell through an NR-Uu interface, and the terminal device communicates with the neighboring cells through LTE-Uu interfaces.

For another example, in the communication architecture in FIG. 2, the location management device is the LMC in the gNB, the serving cell is a cell in which the gNB is located, and the neighboring cell is a cell in which the ng-eNB is located. For example, in step 502, step 504, step 506, and step 508, the location management device may communicate with the serving cell and the neighboring cells through XnAP interfaces. For another example, in step 505, step 509, and step 510, the location management device communicates with the terminal device through an NR-Uu interface. For another example, in step 503, the serving cell may communicate with the neighboring cells through XnAP interfaces. For another example, in step 507, the terminal device communicates with the serving cell through an NR-Uu interface, and the terminal device communicates with the neighboring cells through LTE-Uu interfaces.

Therefore, in this embodiment, the location management device configures the SRS resource for the terminal device, so that the SRS resource can be associated with the downlink reference signal of the cell. This helps the terminal device obtain information about the transmission beam for sending the SRS, and therefore SRS receiving efficiency of the cell can be improved to some extent.

Optionally, in the foregoing embodiments, the SRS may be replaced with another uplink signal, and the another uplink signal may be an uplink signal used for positioning the terminal device.

It should be understood that, in an existing protocol, an SRS is used for positioning a terminal device. In a future evolution technology, it may be proposed that an uplink signal having another name be used for positioning a terminal device. In this case, the SRS in this embodiment may be replaced with the uplink signal having another name.

The embodiments may be independent solutions or may be combined based on internal logic. These solutions all fall within the scope of the embodiments.

It may be understood that in the foregoing method embodiments, a method implemented by the terminal device may alternatively be implemented by a component (for example, a chip or a circuit) that may be used in the terminal device, and a method implemented by the location management device may alternatively be implemented by a component (for example, a chip or a circuit) that may be used in the location management device.

The foregoing describes the method embodiments, and the following describes apparatus embodiments. It should be understood that descriptions of the apparatus embodiments mutually correspond to the descriptions of the method embodiments. Therefore, for content that is not described in detail, refer to the foregoing method embodiments. For brevity, details are not described herein again.

The foregoing mainly describes, in terms of interaction between various devices, the solutions provided in the embodiments. It may be understood that, to implement the foregoing function, each device, such as a transmit end device or a receive end device, includes a corresponding hardware structure and/or software module for performing each function. A person of ordinary skill in the art may be aware that, in the embodiments, units and algorithm steps in the examples described with reference to the embodiments can be implemented by hardware or a combination of hardware and computer software. Whether a function is performed by hardware or hardware driven by computer software depends on particular applications and design constraints of the solutions. A person of ordinary skill in the art may use different methods to implement the described functions for each particular application, but it should not be considered that the implementation goes beyond the scope of the embodiments.

In the embodiments, a transmit end device or a receive end device may be divided into functional modules based on the foregoing method examples. For example, the transmit end device or the receive end device may be divided into functional modules corresponding to functions, or two or more functions may be integrated into one processing module. The foregoing integrated module may be implemented in a form of hardware, or may be implemented in a form of a software function module. It should be noted that, in the embodiments, division into the modules is an example, and is merely logical function division. In actual implementation, another division manner may be used. An example in which functional modules are obtained through division based on functions is used below for descriptions.

Figure 6:
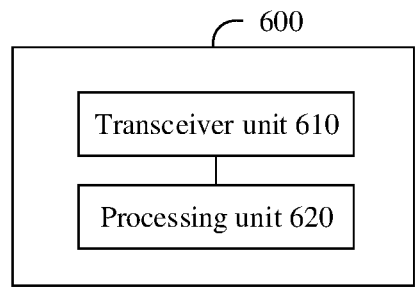
FIG. 6 is a schematic block diagram of a communication device according to an embodiment.

FIG. 6 is a schematic block diagram of a communication device 600 according to an embodiment. The communication device 600 includes a transceiver unit 610 and a processing unit 620. The transceiver unit 610 may communicate with the outside, and the processing unit 610 is configured to process data. The transceiver unit 610 may also be referred to as a communication interface or a communication unit.

The communication device 600 may be configured to perform an action performed by the terminal device in the foregoing method embodiments, the communication device 600 may be configured to perform an action performed by the cell in the foregoing method embodiments, or the communication device 600 may be configured to perform an action performed by the location management device in the foregoing method embodiments.

In an implementation, the communication device 600 may be configured to perform an action performed by the location management device in the foregoing method embodiments.

In this implementation, the communication device 600 may be referred to as the location management device. The transceiver unit 610 is configured to perform a sending/receiving-related operation on the location management device side in the foregoing method embodiments, and the processing unit 620 is configured to perform a processing-related operation of the location management device in the foregoing method embodiments.

The transceiver unit 610 is configured to receive first sounding reference signal (SRS) resource configuration information from a cell.

The processing unit 620 is configured to determine second SRS resource configuration information, where the second SRS resource configuration information includes third SRS resource configuration information and a downlink reference signal that is of the cell and that is associated with an SRS resource indicated by the third SRS resource configuration information, and the third SRS resource configuration information is a part or all of the first SRS resource configuration information.

The transceiver unit 610 is further configured to send the second SRS resource configuration information to a terminal device.

In the solutions of the embodiments, the location management device configures the SRS resource for the terminal device, so that the SRS resource can be associated with the downlink reference signal of the cell. This helps the terminal device obtain beam information for sending the SRS, and therefore SRS transmission efficiency can be improved to some extent.

Optionally, the cell includes a serving cell and/or a neighboring cell of the terminal device.

For explanation of the first SRS resource configuration information, the second SRS resource configuration information, and the downlink reference signal associated with the SRS resource indicated by the third SRS resource configuration information, refer to the foregoing descriptions. For brevity, details are not described herein again.

Optionally, in some embodiments, the second SRS resource configuration information further includes an uplink timing advance (TA) of the cell.

For example, the uplink TA of the cell is obtained by the location management device based on an estimated location of the terminal device and a location of the cell.

Optionally, in some embodiments, the second SRS resource configuration information further includes: spatial relationship information of the SRS resource indicated by the third SRS resource configuration information.

For explanations of the spatial relationship information of the SRS resource, refer to the foregoing descriptions. Details are not described herein again.

Optionally, in some embodiments, the transceiver unit 610 is further configured to send an SRS resource request message to the cell, to request the first SRS resource configuration information.

Optionally, in some embodiments, the transceiver unit 610 is further configured to send the SRS measurement request message to the cell, where the SRS measurement request message includes the third SRS resource configuration information and a measurement type, and the measurement type includes any one or more of the following: SRS reception time information, SRS reception angle information, or an SRS-based Rx-Tx time difference.

Optionally, in some embodiments, the SRS measurement request message further includes: the spatial relationship information of the SRS resource indicated by the third SRS resource configuration information.

Optionally, in some embodiments, the transceiver unit 610 is further configured to receive an SRS measurement result from the cell, where the SRS measurement result includes any one or more of the following: SRS reception time information, SRS reception angle information, or an SRS-based Rx-Tx time difference.

Optionally, in some embodiments, the transceiver unit 610 is further configured to request the terminal device to report a difference between a reception time point and a transmission time point for the cell, where the reception time point is a downlink frame timing of the downlink reference signal associated with the SRS resource indicated by the third SRS resource configuration information, and the transmission time point is an uplink frame timing at which the terminal device sends the SRS.

In the solutions of the embodiments, the location management device configures the SRS resource for the terminal device, so that the SRS resource can be associated with the downlink reference signal of the cell. This helps the terminal device obtain the beam information for sending the SRS, and therefore SRS transmission efficiency can be improved to some extent.

In another implementation, the communication device 600 may be configured to perform an action performed by the terminal device in the foregoing method embodiments.

In this implementation, the communication device 600 may be referred to as the terminal device. The transceiver unit 610 is configured to perform a sending/receiving-related operation on the terminal device side in the foregoing method embodiments, and the processing unit 620 is configured to perform a processing-related operation of the terminal device in the foregoing method embodiments.

The transceiver unit 610 is configured to receive first sounding reference signal (SRS) resource configuration information sent by a location management device, where the first SRS resource configuration information includes second SRS resource configuration information and a downlink reference signal that is of a cell and that is associated with an SRS resource indicated by the second SRS resource configuration information, and the cell includes a serving cell and/or a neighboring cell.

The processing unit 620 is configured to: determine the SRS resource indicated by the second SRS resource configuration information, and determine beam information based on the downlink reference signal associated with the SRS resource.

The transceiver unit 610 is further configured to send an SRS based on the SRS resource and the beam information.

In the solutions of the embodiments, the location management device configures the SRS resource for the terminal device, so that the SRS resource can be associated with the downlink reference signal of the cell. This helps the terminal device obtain beam information for sending the SRS, and therefore SRS transmission efficiency can be improved to some extent.

For explanations of the first SRS resource configuration information, the second SRS resource configuration information, and the downlink reference signal associated with the SRS resource indicated by second SRS resource configuration information, refer to the foregoing description. For brevity, details are not described herein again.

Optionally, in some embodiments, the first SRS resource configuration information further includes an uplink timing advance (TA) of the cell. The transceiver unit 610 is configured to send the SRS based on an uplink timing advance (TA) of a cell.

For example, the uplink TA of the cell is obtained by the location management device based on an estimated location of the terminal device and a location of the cell.

Optionally, in some embodiments, the first SRS resource configuration information further includes spatial relationship information of the SRS resource indicated by the second SRS resource configuration information. The transceiver unit 610 is configured to send the SRS by using the beam indicated by the spatial relationship information.

For explanations of the spatial relationship information of the SRS resource, refer to the foregoing descriptions. Details are not described herein again.

Optionally, in some embodiments, the transceiver unit 610 is configured to report, to the location management device, a difference between a reception time point and a transmission time point for the cell, where the reception time point is a downlink frame timing of the downlink reference signal associated with the SRS resource indicated by the second SRS resource configuration information, and the transmission time point is an uplink frame timing at which the terminal device sends the SRS.

In the solutions of the embodiments, the location management device configures the SRS resource for the terminal device, so that the SRS resource can be associated with the downlink reference signal of the cell. This helps the terminal device obtain the beam information for sending the SRS, and therefore SRS transmission efficiency can be improved to some extent.

In still another implementation, the communication device 600 may be configured to perform an action performed by the cell in the foregoing method embodiments.

In this implementation, the communication device 600 may be referred to as a network device in the cell, for example, a base station in the cell. The transceiver unit 610 is configured to perform a sending/receiving-related operation on the cell side in the foregoing method embodiments, and the processing unit 620 is configured to perform a processing-related operation of the cell side in the foregoing method embodiments.

The transceiver unit 610 is configured to: send sounding reference signal (SRS) resource configuration information to a location management device; and receive an SRS from a terminal device, where the SRS is a part or all of SRSs indicated by the SRS resource configuration information.

The processing unit 620 is configured to measure the received SRS to obtain an SRS measurement result.

The transceiver unit 610 is further configured to send the SRS measurement result to the location management device, where the measurement result includes any one or more of the following: SRS reception time information, SRS reception angle information, or an SRS-based Rx-Tx time difference.

The SRS resource configuration information in this implementation corresponds to the first SRS resource configuration information in the foregoing embodiments. For explanations of the first SRS resource configuration information, refer to the foregoing descriptions. For brevity, details are not described herein again.

Optionally, the cell includes a serving cell and/or a neighboring cell of the terminal device.

Optionally, in some embodiments, the SRS measurement request message is received from the location management device, where the SRS measurement request message includes spatial relationship information of a part or all of SRS resources indicated by the SRS resource configuration information. The transceiver unit 610 is further configured to receive the SRS based on the spatial relationship information.

It should be understood that the processing unit 620 in the foregoing embodiment may be implemented by a processor or a processor-related circuit, and the transceiver unit 610 may be implemented by a transceiver or a transceiver-related circuit.

Figure 7:
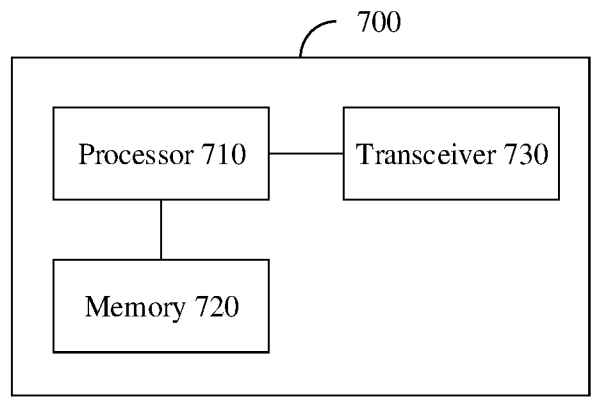
FIG. 7 is another schematic block diagram of a communication device according to an embodiment.

As shown in FIG. 7, an embodiment further provides a communication device 700. The communication device 700 includes a processor 710, a memory 720, and a transceiver 730. The memory 720 stores a program. The processor 710 is configured to execute the program stored in the memory 720. The program stored in the memory 720 is executed, so that the processor 710 is configured to perform related processing steps in the foregoing method embodiments, and the program stored in the memory 720 is executed, so that the processor 710 controls the transceiver 730 to perform related sending and receiving steps in the foregoing method embodiments.

In an implementation, the communication device 700 is configured to perform an action performed by the terminal device in the foregoing method embodiments. In this case, the program stored in the memory 720 is executed, so that the processor 710 is configured to perform processing steps on the terminal device side in the foregoing method embodiments, and the program stored in the memory 720 is executed, so that the processor 710 controls the transceiver 730 to perform the receiving and sending steps on the terminal device side in the foregoing method embodiments.

In another implementation, the communication device 700 is configured to perform an action performed by the location management device in the foregoing method embodiments. In this case, the program stored in the memory 720 is executed, so that the processor 710 is configured to perform processing steps on the location management device side in the foregoing method embodiments, and the program stored in the memory 720 is executed, so that the processor 710 controls the transceiver 730 to perform the receiving and sending steps on the location management device side in the foregoing method embodiments.

In another implementation, the communication device 700 is configured to perform an action performed by the cell in the foregoing method embodiments. In this case, the program stored in the memory 720 is executed, so that the processor 710 is configured to perform processing steps on the cell side in the foregoing method embodiments, and the program stored in the memory 720 is executed, so that the processor 710 controls the transceiver 730 to perform the receiving and sending steps on the cell side in the foregoing method embodiments.

An embodiment further provides a communication apparatus 800. The communication apparatus 800 may be a terminal device or a chip. The communication device 800 may be configured to perform an action performed by the terminal device in the foregoing method embodiments.

Figure 8:
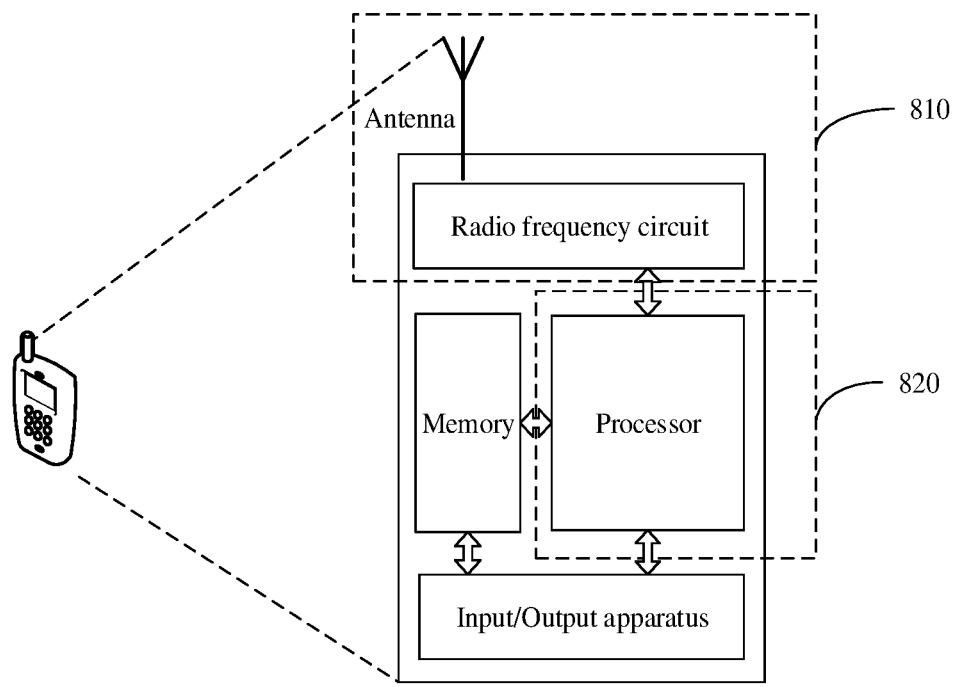
FIG. 8 is a schematic block diagram of a terminal device according to an embodiment.

When the communication device 800 is a terminal device, FIG. 8 is a simplified schematic structural diagram of the terminal device. For ease of understanding and convenience of figure illustration, an example in which the terminal device is a mobile phone is used in FIG. 8. As shown in FIG. 8, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and data. The radio frequency circuit is mainly configured to: perform conversion between a baseband signal and a radio frequency signal, and process the radio frequency signal. The antenna is mainly configured to receive and transmit a radio frequency signal in an electromagnetic wave form. The input/output apparatus, such as a touchscreen, a display screen, or a keyboard, is mainly configured to: receive data entered by a user, and output data to the user. It should be noted that some types of terminal devices may have no input/output apparatus.

When data needs to be sent, after performing baseband processing on the to-be-sent data, the processor outputs a baseband signal to the radio frequency circuit; and the radio frequency circuit performs radio frequency processing on the baseband signal and then sends a radio frequency signal to the outside in a form of an electromagnetic wave by using the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 8 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments.

In the embodiments, the antenna and the radio frequency circuit that have receiving and sending functions may be considered as a transceiver unit of the terminal device, and the processor that has a processing function may be considered as a processing unit of the terminal device.

As shown in FIG. 8, the terminal device includes a transceiver unit 810 and a processing unit 820. The transceiver unit 810 may also be referred to as a transceiver, a transceiver machine, a transceiver apparatus, or the like. The processing unit 820 may also be referred to as a processor, a processing board, a processing module, a processing apparatus, or the like. Optionally, a component for implementing a receiving function in the transceiver unit 810 may be considered as a receiving unit, and a component for implementing a sending function in the transceiver unit 810 may be considered as a sending unit. In other words, the transceiver unit 810 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

For example, in an implementation, the transceiver unit 810 is further configured to perform the receiving operation on the terminal device side in step 320 shown in FIG. 3, and/or the transceiver unit 810 is further configured to perform other receiving and sending steps on the terminal device side. The processing unit 820 is configured to perform the processing steps on the terminal device side in the embodiments, for example, determine, based on the second SRS resource configuration information received in step 320, the time-frequency resource used to send the SRS.

For another example, in an implementation, the transceiver unit 810 is further configured to perform the receiving operation on the terminal device side in step 505 and step 509 and the sending operation on the terminal device side in step 510 shown in FIG. 5, and/or the transceiver unit 810 is further configured to perform other receiving and sending steps on the terminal device side. The processing unit 820 is configured to perform the processing operations on the terminal device side in step 501 and step 507 shown in FIG. 5, and/or the processing unit 820 is further configured to perform other processing steps on the terminal device side in the embodiments.

It should be understood that FIG. 8 is merely an example instead of a limitation. The terminal device including the transceiver unit and the processing unit may not depend on the structure shown in FIG. 8.

When the communication device 800 is a chip, the chip includes a transceiver unit and a processing unit. The transceiver unit may be an input/output circuit or a communication interface. The processing unit may be a processor, a microprocessor, or an integrated circuit integrated on the chip.

An embodiment further provides a communication device 900. The communication device 900 may be a network device or a chip. The communication device 900 may be configured to perform an action performed by the cell in the foregoing method embodiments.

Figure 9:
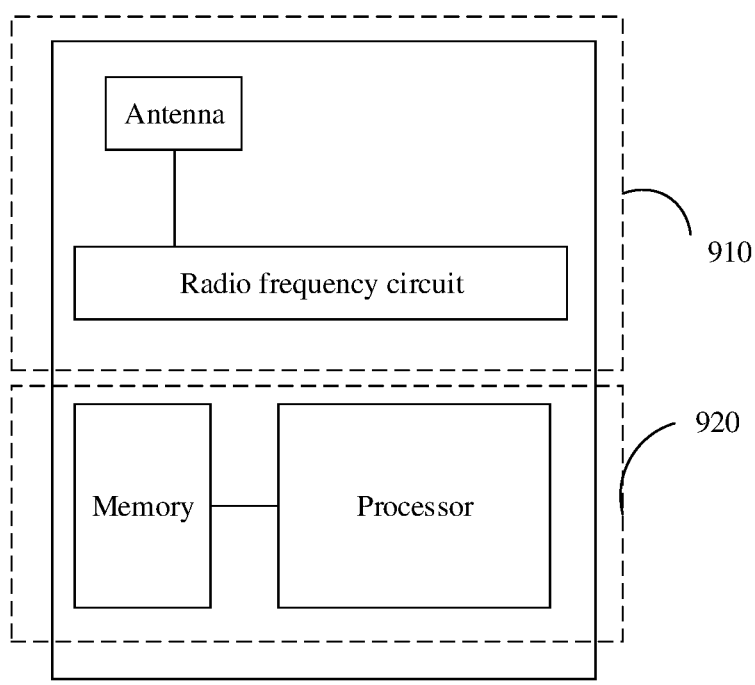
FIG. 9 is a schematic block diagram of a network device according to an embodiment.

When the communication device 900 is a network device, for example, a base station, FIG. 9 is a simplified schematic structural diagram of the base station. The base station includes a part 910 and a part 920. The part 910 is mainly configured to: send and receive a radio frequency signal, and perform conversion between the radio frequency signal and a baseband signal. The part 920 is mainly configured to: perform baseband processing, control the base station, and the like. The part 910 may be usually referred to as a transceiver unit, a transceiver machine, a transceiver circuit, a transceiver, or the like. The part 920 is usually a control center of the base station, and may usually be referred to as a processing unit, and is configured to control the base station to perform processing operations on the network device side in the foregoing method embodiments.

The transceiver unit in the part 910 may also be referred to as a transceiver machine, a transceiver, or the like. The transceiver unit includes an antenna and a radio frequency unit. The radio frequency unit is mainly configured to perform radio frequency processing. Optionally, a component for implementing a receiving function in the part 910 may be considered as a receiving unit, and a component for implementing a sending function may be considered as a sending unit. That is, the part 910 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 920 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, alternatively, the plurality of boards may share one or more processors, or the plurality of boards share one or more memories, or the plurality of boards simultaneously share one or more processors.

For example, in an implementation, the transceiver unit in the part 910 is configured to perform the sending operation on the cell side in step 310 in FIG. 3, and/or the transceiver unit in the part 910 is further configured to perform other receiving and sending steps on the cell side in the embodiments. The processing unit in the part 920 is configured to perform the processing steps on the cell side in the embodiments.

For another example, in another implementation, the transceiver unit in the part 910 is configured to perform the transceiver operations the cell side in step 501, step 502, step 504, step 506, step 507, and step 508 in FIG. 5, and/or the transceiver unit 910 is further configured to perform other receiving and sending steps on the cell side in the embodiments. The processing unit in the part 920 is configured to perform the cell-side processing steps in step 501, step 503, and step 507 in FIG. 5.

It should be understood that FIG. 9 is merely an example instead of a limitation. The network device including the transceiver unit and the processing unit may not depend on the structure shown in FIG. 9.

When the communication device 900 is a chip, the chip includes a transceiver unit and a processing unit. The transceiver unit may be an input/output circuit or a communication interface. The processing unit is a processor, a microprocessor, or an integrated circuit integrated on the chip.

An embodiment further provides a communication system. The communication system includes the location management device, the cell, and the terminal device in the foregoing embodiments.

An embodiment further provides a computer-readable storage medium. The computer-readable storage medium stores a computer program. When the computer program is executed by a computer, the computer is enabled to implement the method on the terminal device side or the method on the location management device side in the foregoing method embodiments.

An embodiment further provides a computer program product including instructions. When the instructions are executed by a computer, the computer is enabled to implement the method on the terminal device side or the method on the location management device side in the foregoing method embodiments.

For explanations and beneficial effects of related content of any of the communication apparatuses provided above, refer to the corresponding method embodiments provided above, and details are not described herein again.

In the embodiments, the terminal device or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more of computer operating systems, for example, a Linux operating system, a Unix operating system, an Android operating system, an iOS operating system, or a Windows operating system, that implement service processing by using a process. The application layer includes applications such as a browser, an address book, word processing software, and instant communication software. In addition, a specific structure of an execution body of the method provided in the embodiments is not limited in the embodiments, provided that a program that records code for the method provided in the embodiments can be run to perform communication according to the method provided in the embodiments. For example, the method provided in the embodiments may be performed by the terminal device, the network device, or a function module that is in the terminal device or the network device and that can invoke and execute the program.

In addition, aspects or features of the embodiments may be implemented as a method, an apparatus, or a product that uses standard programming and/or engineering technologies. The term "product" covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described may indicate one or more devices and/or other machine-readable media that are configured to store information. The term "machine-readable media" may include but is not limited to a wireless channel, and various other media that can store, include, and/or carry instructions and/or data.

It should be understood that the processor mentioned in an embodiment may be a central processing unit (CPU), or another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be understood that the memory mentioned in this embodiment may be a volatile memory or a nonvolatile memory or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, the memory (a storage module) is integrated into the processor.

It should be noted that the memory described aims to include, but is not limited to, these memories and any memory of another proper type.

A person of ordinary skill in the art may be aware that units and algorithm steps in the examples described with reference to the embodiments may be implemented by electronic hardware or a combination of computer software and electronic hardware. Whether the functions are performed by hardware or software depends on particular applications and design constraints of the solutions. A person of ordinary skill in the art may use different methods to implement the described functions for each particular application, but it should not be considered that the implementation goes beyond the scope.

It may be clearly understood by a person of ordinary skill in the art that, for the purpose of convenient and brief description, for a detailed working process of the foregoing system, apparatus, and unit, refer to a corresponding process in the foregoing method embodiments. Details are not described herein again.

In the several embodiments provided in the embodiments, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units may be integrated into one unit.

When functions are implemented in a form of a software function unit and sold or used as an independent product, the functions may be stored in a computer-readable storage medium. Based on such an understanding, the solutions essentially, or the part contributing to the conventional technology, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of embodiments, and are non-limiting. Any variation or replacement readily figured out by a person of ordinary skill in the art within the scope disclosed in the embodiments shall fall within the scope of the embodiments.

What is claimed is:

1. A signal transmission method, comprising:
   receiving, by a location management device, sounding reference signal (SRS) resource configuration information from a cell;
   sending, by the location management device to a terminal device, a portion of the SRS resource configuration information received from the cell and a downlink reference signal that is of the cell and that is associated with an SRS resource indicated by the portion of the SRS resource configuration information received from the cell; and
   requesting, by the location management device, the terminal device to report a difference between a reception time point and a transmission time point for the cell, wherein the reception time point is a downlink frame timing of the downlink reference signal associated with the SRS resource indicated by the portion of the SRS resource configuration information received from the cell, and the transmission time point is an uplink frame timing at which the terminal device sends an SRS.

2. The method according to claim 1, wherein the downlink reference signal associated with the SRS resource indicated by the portion of the SRS resource configuration information received from the cell is a downlink positioning reference signal of the cell.

3. The method according to claim 1, further comprising sending, by the location management device to the terminal device, an uplink timing advance (TA) of the cell.

4. The method according to claim 1, further comprising sending, by the location management device to the terminal device, spatial relationship information of the SRS resource indicated by the portion of the SRS resource configuration information received from the cell.

5. The method according to claim 1, further comprising:
   sending, by the location management device, an SRS measurement request message to the cell, wherein the SRS measurement request message comprises the portion of the SRS resource configuration information received from the cell and a measurement type, and the measurement type comprises any one or more of the following: SRS reception time information, SRS reception angle information, or an SRS-based Rx-Tx time difference.

6. The method according to claim 5, further comprising:
   receiving, by the location management device, an SRS measurement result from the cell, wherein the SRS measurement result comprises one or more of: SRS reception time information, SRS reception angle information, or an SRS-based Rx-Tx time difference.

7. The method according to claim 1, wherein the cell comprises a serving cell and a neighboring cell of the terminal device.

8. The method according to claim 1, wherein the cell comprises a serving cell of the terminal device.

9. The method according to claim 1, wherein the cell comprises a neighboring cell of the terminal device.

10. The method according to claim 1, wherein the downlink reference signal associated with the SRS resource indicated by the portion of the SRS resource configuration information received from the cell is a synchronization signal/physical broadcast channel (SS/PBCH) block of the cell.

11. The method according to claim 1, further comprising:
    sending, by the location management device, an SRS measurement request message to the cell, wherein the SRS measurement request message comprises the portion of the SRS resource configuration information received from the cell and SRS reception time information.

12. The method according to claim 1, further comprising:
    sending, by the location management device, an SRS measurement request message to the cell, wherein the SRS measurement request message comprises the portion of the SRS resource configuration information received from the cell and SRS reception angle information.

13. The method according to claim 1, further comprising:
    sending, by the location management device, an SRS measurement request message to the cell, wherein the SRS measurement request message comprises the portion of the SRS resource configuration information received from the cell and an SRS-based Rx-Tx time difference.

* * * * *